United States Patent
Yabe et al.

(10) Patent No.: US 8,937,420 B2
(45) Date of Patent: Jan. 20, 2015

(54) ROTOR OF PERMANENT MAGNET EMBEDDED MOTOR, BLOWER, AND COMPRESSOR

(75) Inventors: Koji Yabe, Tokyo (JP); Hayato Yoshino, Tokyo (JP); Kazuhiko Baba, Tokyo (JP)

(73) Assignee: Mitsubishi Electric Corporation, Chiyoda-Ku, Tokyo (JP)

(*) Notice: Subject to any disclaimer, the term of this patent is extended or adjusted under 35 U.S.C. 154(b) by 63 days.

(21) Appl. No.: 13/513,951

(22) PCT Filed: Mar. 25, 2010

(86) PCT No.: PCT/JP2010/055182
§ 371 (c)(1),
(2), (4) Date: Jun. 5, 2012

(87) PCT Pub. No.: WO2011/096094
PCT Pub. Date: Nov. 8, 2011

(65) Prior Publication Data
US 2012/0242182 A1    Sep. 27, 2012

(30) Foreign Application Priority Data
Feb. 8, 2010 (JP) ................................. 2010-025870

(51) Int. Cl.
*H02K 1/27* (2006.01)
*H02K 29/03* (2006.01)

(52) U.S. Cl.
CPC ............. *H02K 1/276* (2013.01); *H02K 29/03* (2013.01)
USPC ............. 310/156.53; 310/156.56; 310/156.57

(58) Field of Classification Search
USPC ........... 310/156.01–156.84, 216.009, 156.57, 310/156.53, 156.56, 156.48
See application file for complete search history.

(56) References Cited

U.S. PATENT DOCUMENTS

| 8,089,190 B2* | 1/2012 | Lee et al. ................. 310/156.53 |
| 8,106,557 B2* | 1/2012 | Yoshino et al. .......... 310/156.53 |

(Continued)

FOREIGN PATENT DOCUMENTS

| CN | 101110528 A | 1/2008 |
| JP | 2005-94968 A | 4/2005 |

(Continued)

OTHER PUBLICATIONS

JP 2008187778 A machine translation May 4, 2014.*

(Continued)

*Primary Examiner* — Tran Nguyen
*Assistant Examiner* — Leda Pham
(74) *Attorney, Agent, or Firm* — Buchanan Ingersoll & Rooney PC

(57) ABSTRACT

A rotor of a permanent magnet embedded motor includes a rotor iron core formed by stacking a predetermined number of magnetic steel sheets punched into predetermined shapes, a plurality of permanent-magnet insertion holes formed along an outer circumferential portion of the rotor iron core and each including permanent-magnet end-portion cavities on its both ends, a plurality of permanent magnets inserted into the permanent-magnet insertion holes, and a plurality of slits formed in the outer-peripheral side iron core portion outside of each permanent-magnet insertion holes, wherein a distance between a first slit present in a radial direction of each of the end portions of the permanent magnets and a second slit, which is adjacent to the first slit and closer to the center of its magnetic pole, is smaller than a distance between those slits other than the first and second slits.

11 Claims, 25 Drawing Sheets

(56) References Cited

U.S. PATENT DOCUMENTS

| | | | |
|---|---|---|---|
| 2006/0273678 A1* | 12/2006 | Futami | 310/156.53 |
| 2008/0018190 A1* | 1/2008 | Takahata et al. | 310/156.56 |
| 2008/0224558 A1* | 9/2008 | Ionel | 310/156.57 |
| 2010/0244609 A1 | 9/2010 | Takahata et al. | |

FOREIGN PATENT DOCUMENTS

| | | |
|---|---|---|
| JP | 2008-29095 A | 2/2008 |
| JP | 2008-167583 A | 7/2008 |
| JP | 2008-187778 A | 8/2008 |
| JP | 2008187778 A * | 8/2008 |
| WO | 2008/102439 A1 | 8/2008 |

OTHER PUBLICATIONS

International Search Report (PCT/ISA/210) issued on Jun. 8, 2010, by the Japanese Patent Office as the International Searching Authority for International Application No. PCT/JP2010/055182.

Written Opinion (PCT/ISA/237) issued on Jun. 8, 2010, by the Japanese Patent Office as the International Searching Authority for International Application No. PCT/JP2010/055182.

Japanese Office Action (Notice of Rejection) dated Aug. 6, 2013, issued by the Japanese Patent Office in corresponding Japanese Patent Application No. 2011-552640, and partial English language translation of Office Action. (7 pages).

Chinese First Office Action issued on Mar. 4, 2014 in corresponding Chinese Patent Application No. 201080063331X and English Language translation (14 pages).

* cited by examiner

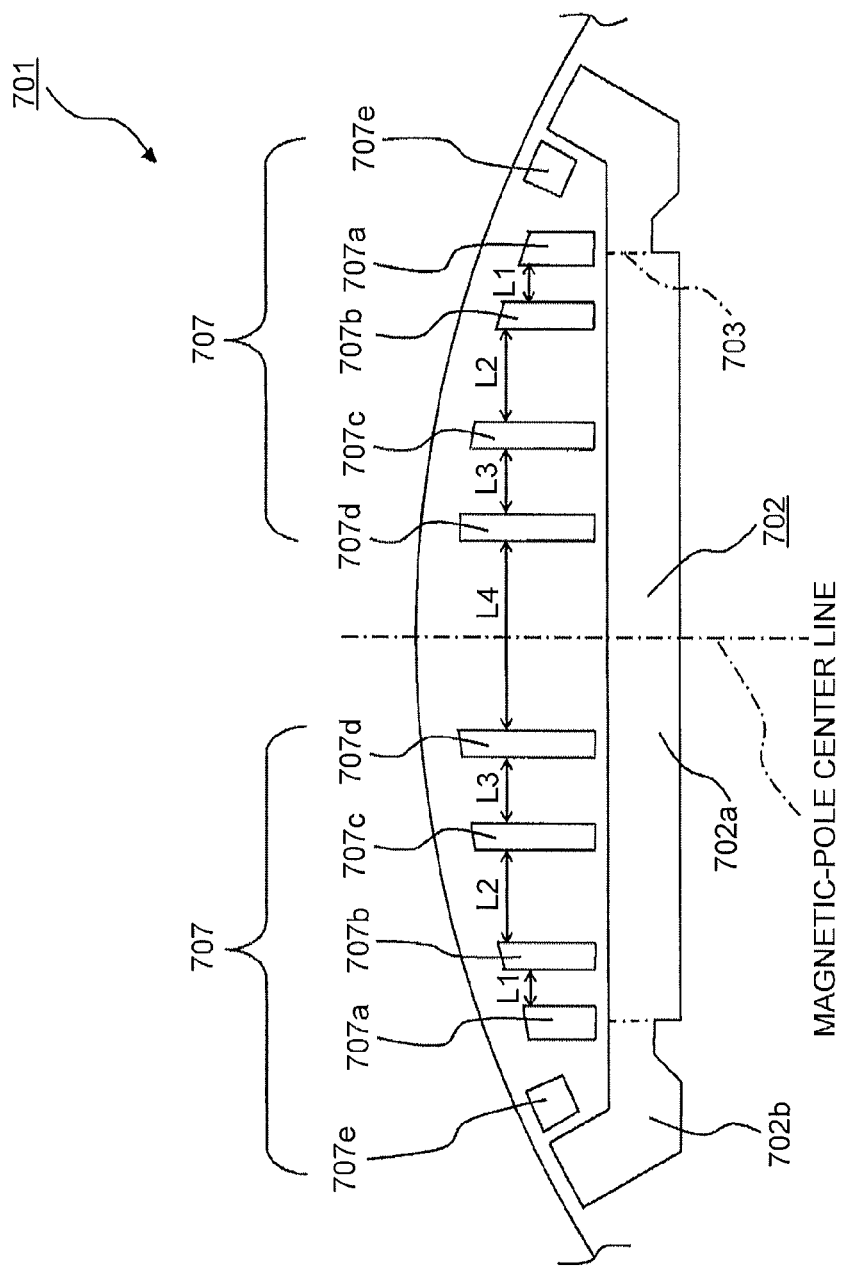

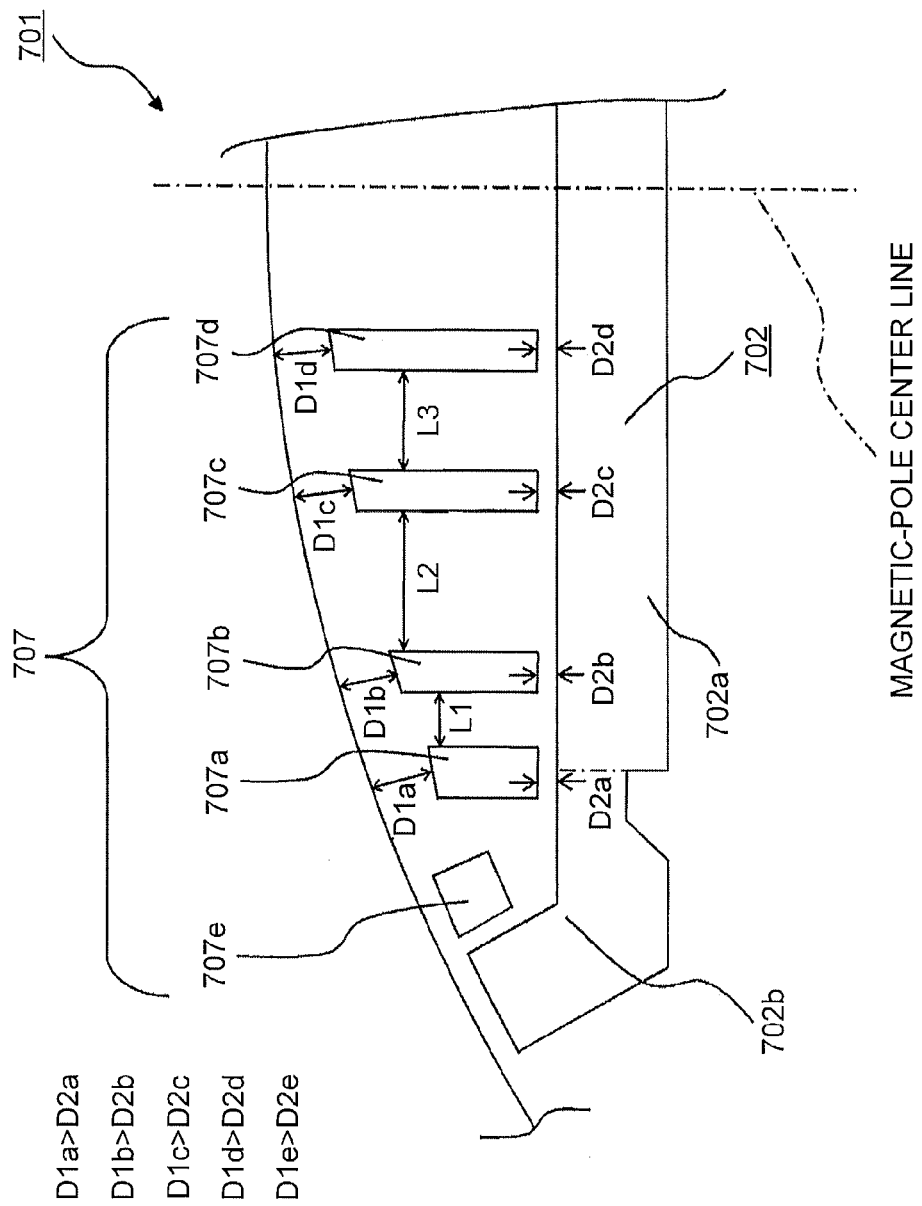

ROTOR OF PERMANENT MAGNET EMBEDDED MOTOR, BLOWER, AND COMPRESSOR

FIELD

The present invention relates to a rotor of a permanent magnet embedded motor, and more particularly to shapes of slits arranged in an outer-peripheral side iron core portion of each of permanent-magnet insertion holes. The present invention also relates to a blower and a compressor each of which uses the permanent magnet embedded motor having the rotor of a permanent magnet embedded motor incorporated therein. Hereinafter, the permanent magnet embedded motor is also simply referred to as "motor".

BACKGROUND

Conventionally, a rotor of a permanent magnet embedded motor configured as described below has been proposed. That is, the rotor of a permanent magnet embedded motor includes a rotor iron core that is formed by stacking a plurality of magnetic steel sheets, permanent-magnet insertion holes that are formed in a shaft direction of this rotor iron core and that are formed in regions corresponding to each side of a substantially regular polygon that centers on a shaft center, permanent magnets respectively inserted into the permanent-magnet insertion holes, a plurality of slits that are formed in an outer-peripheral side iron core portion of each of the permanent-magnet insertion holes and arranged with a gap from one another along each permanent-magnet insertion hole, and an outer thin portion that is provided between radially outer ends of these slits and the outer circumference of the rotor iron core and has a radial width that becomes greater as the outer thin portion comes closer to interpolar portions from the center of magnetic poles of each of the permanent magnets. With this configuration, the rotor of a permanent magnet embedded motor can reduce the harmonic components of magnetic-flux density waveforms in the interpolar portions, and can reduce the harmonics of an inductive voltage and cogging torque (see, for example, Patent Literature 1).

CITATION LIST

Patent Literature

Patent Literature 1: Japanese Patent Application Laid-open No. 2008-167583

SUMMARY

Technical Problem

As described in Patent Literature 1 mentioned above, the conventional rotor of a permanent magnet embedded motor is designed to reduce torque ripple and noise by providing a plurality of slits in the outer-peripheral side iron core portion along each of the permanent-magnet insertion holes. However, the conventional rotor has problems that the permeance of the permanent magnets decreases by providing the slits, and that the permanent magnets are likely to be demagnetized because the magnetic flux from a stator concentrates and acts on the permanent magnets.

The present invention has been achieved to solve the above problems, and the present invention is to provide a rotor of a permanent magnet embedded motor capable of reducing magnetic flux acting on end portions of permanent magnets that are likely to be demagnetized and capable of improving demagnetization resistance in a state that slits are formed in the outer-peripheral side iron core portion of each of the permanent-magnet insertion holes.

The present invention is to also provide a blower and a compressor in each of which the permanent magnet embedded motor that uses the rotor of a permanent magnet embedded motor is incorporated.

Solution to Problem

In order to solve the aforementioned problems, a rotor of a permanent magnet embedded motor according to one aspect of the present invention is constructed in such a manner as to include: a rotor iron core formed by stacking a predetermined number of magnetic steel sheets punched into predetermined shapes; a plurality of permanent-magnet insertion holes formed along an outer circumferential portion of the rotor iron core, each of the permanent-magnet insertion holes including permanent-magnet end-portion cavities on its respective end portions; a plurality of permanent magnets respectively inserted into the permanent-magnet insertion holes; and a plurality of slits formed in an outer-peripheral iron core portion outside of each of the permanent-magnet insertion holes, wherein among the plurality of slits, a distance between a first slit present in a radial direction of each end portion of the permanent magnets and a second slit, which is adjacent to the first slit and closer to the center of each magnetic pole, is smaller than a distance between adjacent slits other than the first and second slits, which are present in the outer-peripheral side iron core portion outside of each of the permanent-magnet insertion holes.

Advantageous Effects of Invention

In the rotor of a permanent magnet embedded motor according to the present invention, the distance between the first slit present in the radial direction of each of the end portions of each of the permanent magnets and the second slit adjacent to the first slit and closer to the center of magnetic poles is smaller than the distance between adjacent slits other than the first and second slits and present in the outer-peripheral side iron core portion of each of the permanent-magnet insertion holes. It is thereby possible to reduce the magnetic flux acting on the end portions of each of the permanent magnets that are likely to be demagnetized and to improve demagnetization resistance.

BRIEF DESCRIPTION OF DRAWINGS

FIG. 24 is a horizontal sectional view of a rotor iron core 701 shown in FIG. 23, which depicts the first embodiment.

FIG. 25 is an enlarged view of FIG. 24.

DESCRIPTION OF EMBODIMENTS

First Embodiment

Figure 1:
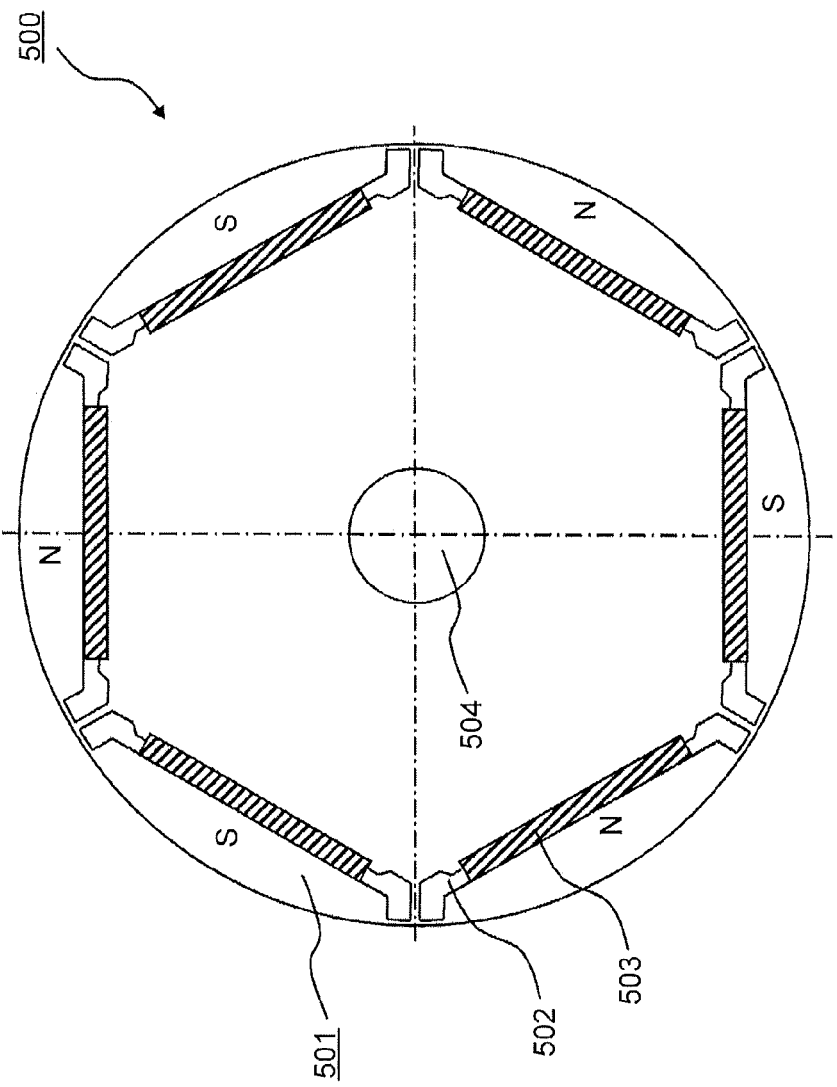
FIG. 1 is a horizontal sectional view of a rotor 500 of an ordinary permanent magnet embedded motor, which is shown for a comparison.
Figure 2:
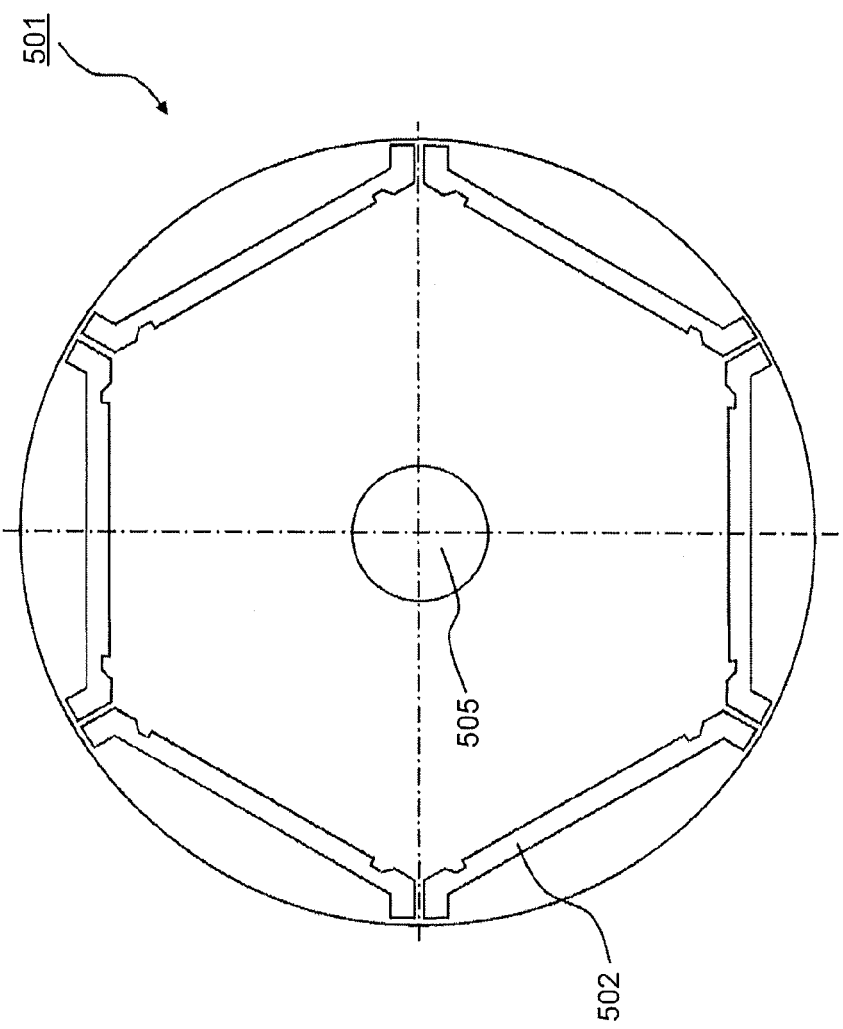
FIG. 2 is a horizontal sectional view of a rotor iron core 501 shown in FIG. 1.
Figure 3:
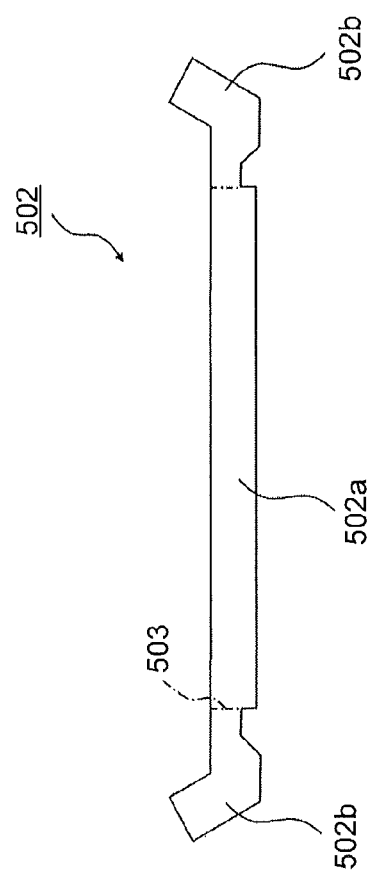
FIG. 3 is an enlarged view of permanent-magnet insertion holes 502 shown in FIG. 1.
Figure 4:
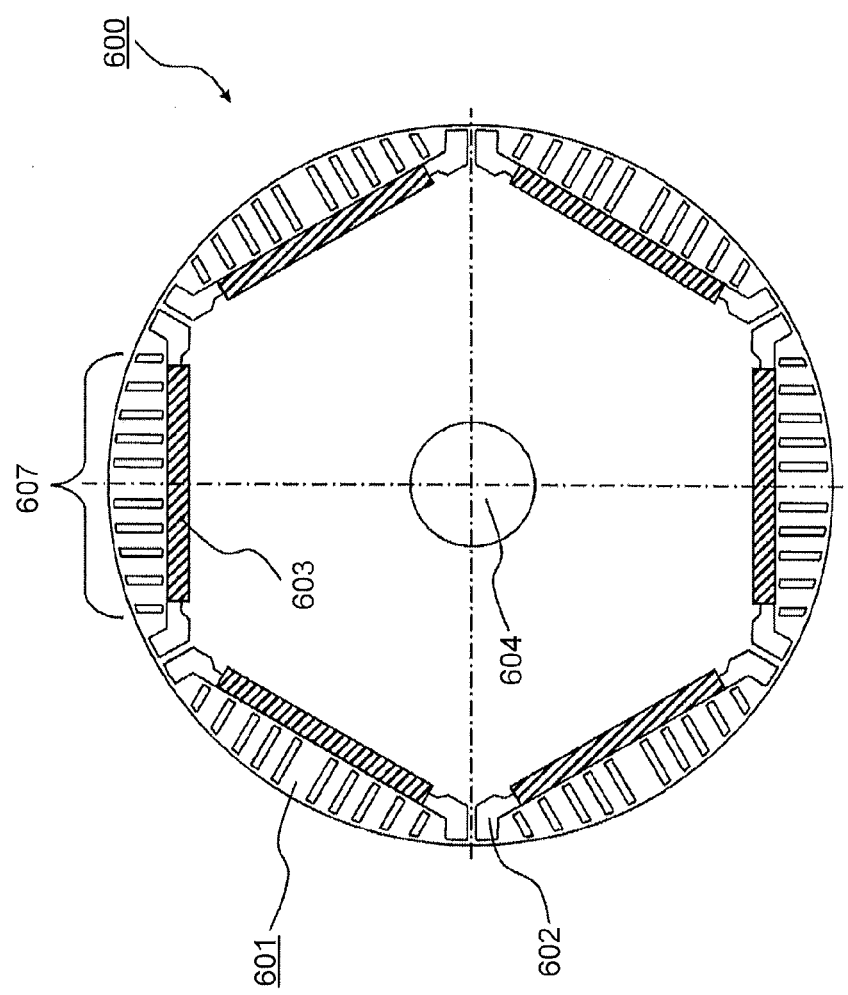
FIG. 4 is a horizontal sectional view of a rotor 600 of a permanent magnet embedded motor that includes ordinary slits 607, which is shown for a comparison.
Figure 5:
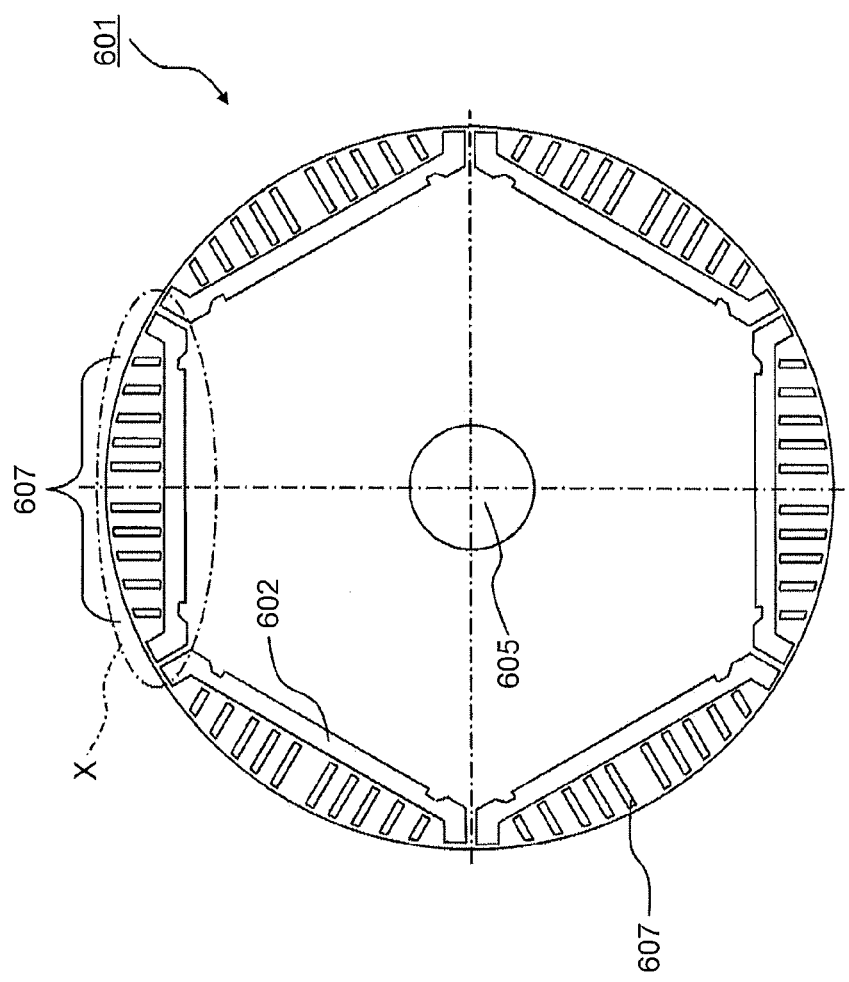
FIG. 5 is a horizontal sectional view of a rotor iron core 601 shown in FIG. 4.
Figure 6:
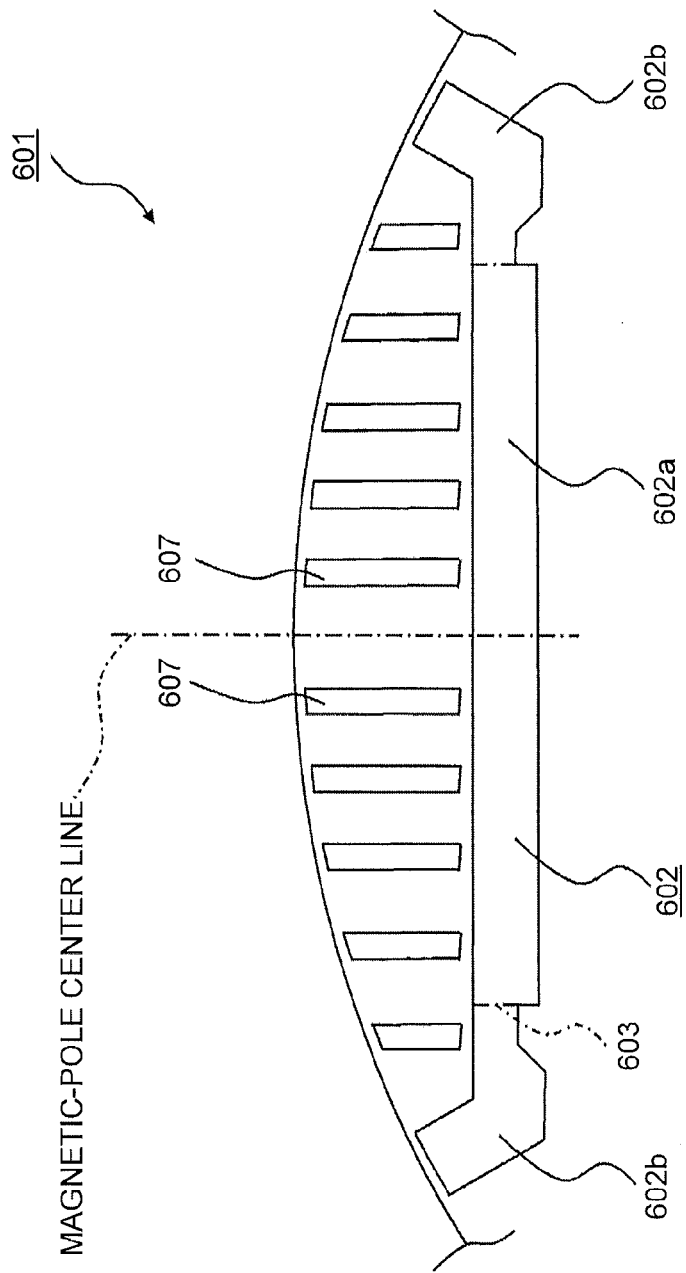
FIG. 6 is an enlarged view of a part X shown in FIG. 5.

FIG. 1 to FIG. 6 are shown for comparisons, where FIG. 1 is a horizontal sectional view of a rotor 500 of an ordinary permanent magnet embedded motor, FIG. 2 is a horizontal sectional view of a rotor iron core 501 shown in FIG. 1, FIG. 3 is an enlarged view of permanent-magnet insertion holes 502 shown in FIG. 1, FIG. 4 is a horizontal sectional view of a rotor 600 of a permanent magnet embedded motor that includes ordinary slits 607, FIG. 5 is a horizontal sectional view of a rotor iron core 601 shown in FIG. 4, and FIG. 6 is an enlarged view of a part X shown in FIG. 5.

The rotor 500 of the ordinary permanent magnet embedded motor is explained first. The rotor 500 of the permanent magnet embedded motor shown in FIG. 1 includes at least the rotor iron core 501, permanent magnets 503, and a rotary shaft 504.

The rotor 500 of the permanent magnet embedded motor or the like may also be simply referred to as "rotor 500" or "rotor".

An overall cross-sectional shape of the rotor iron core 501 is a substantially circular shape, and the rotor iron core 501 is formed by punching thin magnetic steel sheets (for example, non-oriented magnetic steel sheets each of which has a thickness of about 0.1 to 1.0 millimeter (and in which a crystal orientation of each of the crystals is arranged as random as possible so as not to exhibit magnetic characteristics in a specific direction of the steel sheets)) into predetermined shapes by means of a metal mold, and by stacking a predetermined number of (a plurality of) the magnetic steel sheets.

A plurality of (six) permanent-magnet insertion holes 502 having rectangular cross-sections are formed substantially equidistantly in the rotor iron core 501 in a circumferential direction (see FIG. 2). Furthermore, a shaft hole 505 into which the rotary shaft 504 is fitted is formed in a substantially central portion of the rotor iron core 501.

Six flat-plate permanent magnets 503 that are polarized to alternately arrange N and S poles are inserted into magnet inserting portions 502a (see FIG. 3) of the permanent-magnet insertion holes 502, respectively, thereby forming the six-pole rotor 500.

As the permanent magnets 503, rare-earth permanent magnets that contain, for example, neodymium, iron and boron as main components are used.

As shown in FIG. 3, permanent-magnet end-portion cavities 502b connected to (communicating with) the magnet inserting portion 502a at a substantial center of each of the permanent-magnet insertion holes 502 are formed on respective sides of the magnet inserting portion 502a. Each of the permanent-magnet end-portion cavities 502b suppresses leakage flux from the permanent magnet 503 in an interpolar portion (a gap between magnetic poles formed by adjacent permanent magnets 503 or a gap between adjacent permanent-magnet insertion holes 502).

In the rotor 500 shown in FIG. 1, because slits are not present in an iron core portion between each of the permanent-magnet insertion holes 502 and an outer circumferential portion of the rotor iron core 501, the magnetic flux generated from each of the permanent magnets 503 can freely move within the outer-peripheral side iron core portion of the permanent magnet 503. Accordingly, the magnetic flux moves in a direction in which the magnetic flux easily flows and torque ripple is likely to increase by an influence of movement of the magnetic flux.

On the other hand, in the rotor 600 of the permanent magnet embedded motor shown in FIG. 4, a plurality of slits 607 are formed in an outer-peripheral side iron core portion of each of permanent-magnet insertion holes 602 at a predetermined interval in a circumferential direction. In a case of the rotor 600 shown in FIG. 4, ten slits 607 are formed on one magnetic pole.

Similarly to the rotor iron core 501 (FIG. 2), the rotor iron core 601 is formed by punching thin magnetic steel sheets (for example, non-oriented magnetic steel sheets each of which has a thickness of about 0.1 to 1.0 millimeter (and in which a crystal orientation of each of the crystals is arranged as random as possible so as not to exhibit magnetic characteristics in a specific direction of the steel sheets)) into predetermined shapes by means of a metal mold, and by stacking a predetermined number of (a plurality of) the magnetic steel sheets.

Similarly to the rotor iron core 501, a plurality of (six) permanent-magnet insertion holes 602 having rectangular cross-sections are formed substantially equidistantly in the rotor iron core 601 in the circumferential direction (see FIG. 5). Furthermore, a shaft hole 605 into which a rotary shaft 604 is fitted is formed in a substantially central portion of the rotor iron core 601. Six flat-plate permanent magnets 603 that are polarized to alternately arrange N and S poles are inserted into magnet inserting portions 602a (see FIG. 6) of the permanent-magnet insertion holes 602, respectively, thereby forming the six-pole rotor 600.

As the permanent magnets 603, rare-earth permanent magnets that contain, for example, neodymium, iron and boron as main components are used.

As shown in FIG. 6, permanent-magnet end-portion cavities 602b connected to (communicating with) the magnet inserting portion 602a at substantial center of each of the permanent-magnet insertion holes 602 are formed on respective sides of the magnet inserting portion 602a. Each of the permanent-magnet end-portion cavities 602b suppresses leakage flux from the permanent magnet 603 in an interpolar portion (a gap between magnetic poles formed by adjacent permanent magnets 603 or a gap between adjacent permanent-magnet insertion holes 602). As shown in FIG. 6, the slits 607 are formed in the outer-peripheral side iron core portion of each of the permanent-magnet insertion holes 602 at a predetermined interval in the circumferential direction. As shown in FIG. 6, ten slits 607 are formed at each magnetic pole so that five slits 607 are symmetric to other five slits 607 about a center of each magnetic pole.

In the rotor 600 shown in FIG. 4, torque ripple is reduced by arranging the slits 607 in the outer-peripheral side iron core portion of the respective permanent-magnet insertion holes 602. An effect of these slits 607 is explained next. The magnetic flux generated from each of the permanent magnets 603 of the rotor 600 flows into a stator (not shown) by way of the outer-peripheral side iron core portion of the permanent magnet 603. At that time, the iron core portions between the adjacent slits 607 restrict a magnetic path of the magnetic flux generated from the permanent magnets 603.

In the rotor 500 shown in FIG. 1, because no slits are present, the magnetic flux generated from each permanent magnet 503 can freely move within the outer-peripheral side iron core portion of the permanent magnet 503. Accordingly, the magnetic flux moves in the direction in which the magnetic flux easily flows and thus the torque ripple increases by the influence of the movement of the magnetic flux. That is, the slits prevent the magnetic flux generated from the permanent magnets from freely moving in the outer-peripheral side iron core portion of the permanent magnets.

Therefore, the magnetic flux on outer circumferential portions of the rotor can be freely changed by changing the shape of the slits. In the rotor 600 shown in FIG. 4, the torque ripple can be reduced as compared with the rotor 600 that does not include any slits shown in FIG. 1, thereby constituting the low-noise rotor 600.

However, in the rotor 600 shown in FIG. 4, the slits 607 formed in the outer-peripheral side iron core portion of each of the permanent-magnet insertion holes 602 extend to near the permanent magnet 603. Accordingly, the permeance of the permanent magnet 603 near the slits 607 decreases and the demagnetization resistance degrades. Furthermore, because portions of the permanent magnet 603 that are likely to be demagnetized are end portions of the permanent magnet 603, the slits 607 present in the end portions of the permanent magnet 603 cause further degradation in the demagnetization resistance.

As a method of improving the demagnetization resistance, it suffices to prevent the magnetic flux from a stator (not shown) from flowing into the end portions of each of the permanent magnets 603.

Note that the rotary shaft 604 is identical to the rotary shaft 504.

Many of conventional inventions related to slits that are formed in outer-peripheral side iron core portion of each of permanent-magnet insertion holes are intended to reduce harmonic components of an inductive voltage, to reduce cogging torque, and to reduce torque ripple. The present embodiment pays attention to a distance between a slit in one end portion of a permanent magnet and its adjacent slit nearer to the center of the magnetic pole, and to magnetic characteristics in respect of the distance with a view to improving demagnetization resistance when slits are provided in an outer-peripheral side iron core portion of each of permanent-magnet insertion holes. In addition, the present embodiment relates to the shape of the slits that make it difficult to apply an opposing magnetic field from a stator.

Figure 7:
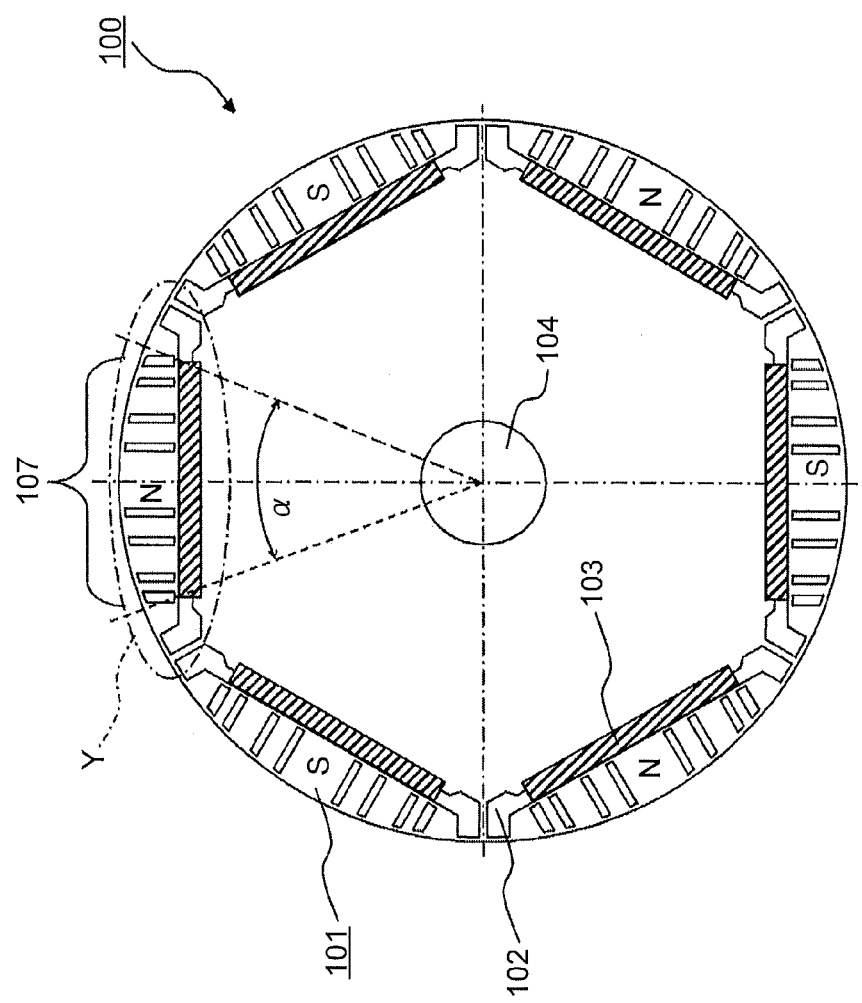
FIG. 7 is a horizontal sectional view of a rotor 100 of a permanent magnet embedded motor, which depicts a first embodiment.
Figure 8:
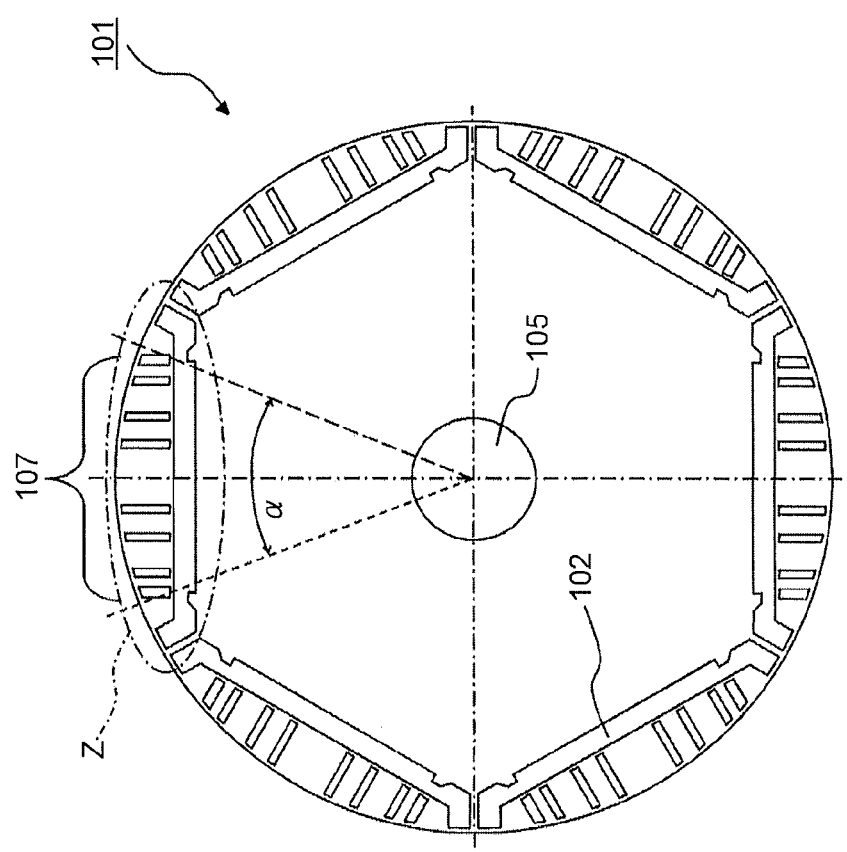
FIG. 8 is a horizontal sectional view of a rotor iron core 101 shown in FIG. 7.
Figure 9:
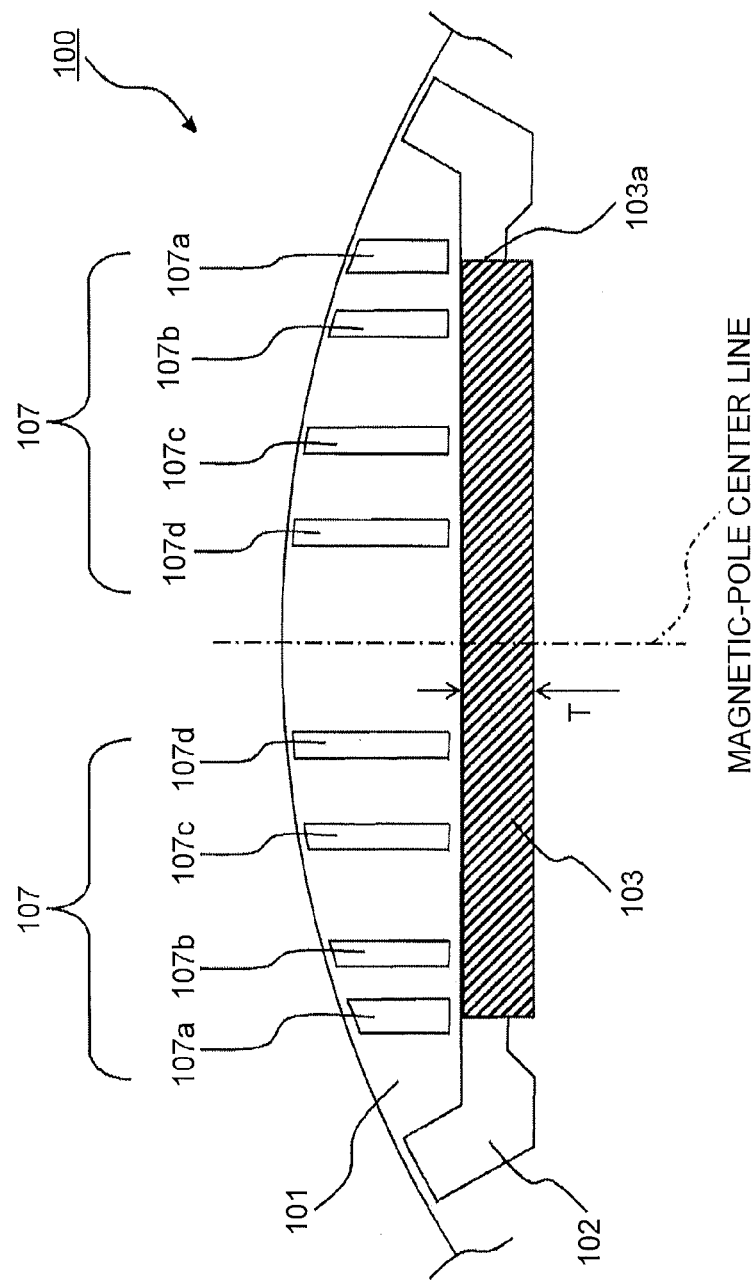
FIG. 9 is an enlarged view of a part Y shown in FIG. 7.
Figure 10:
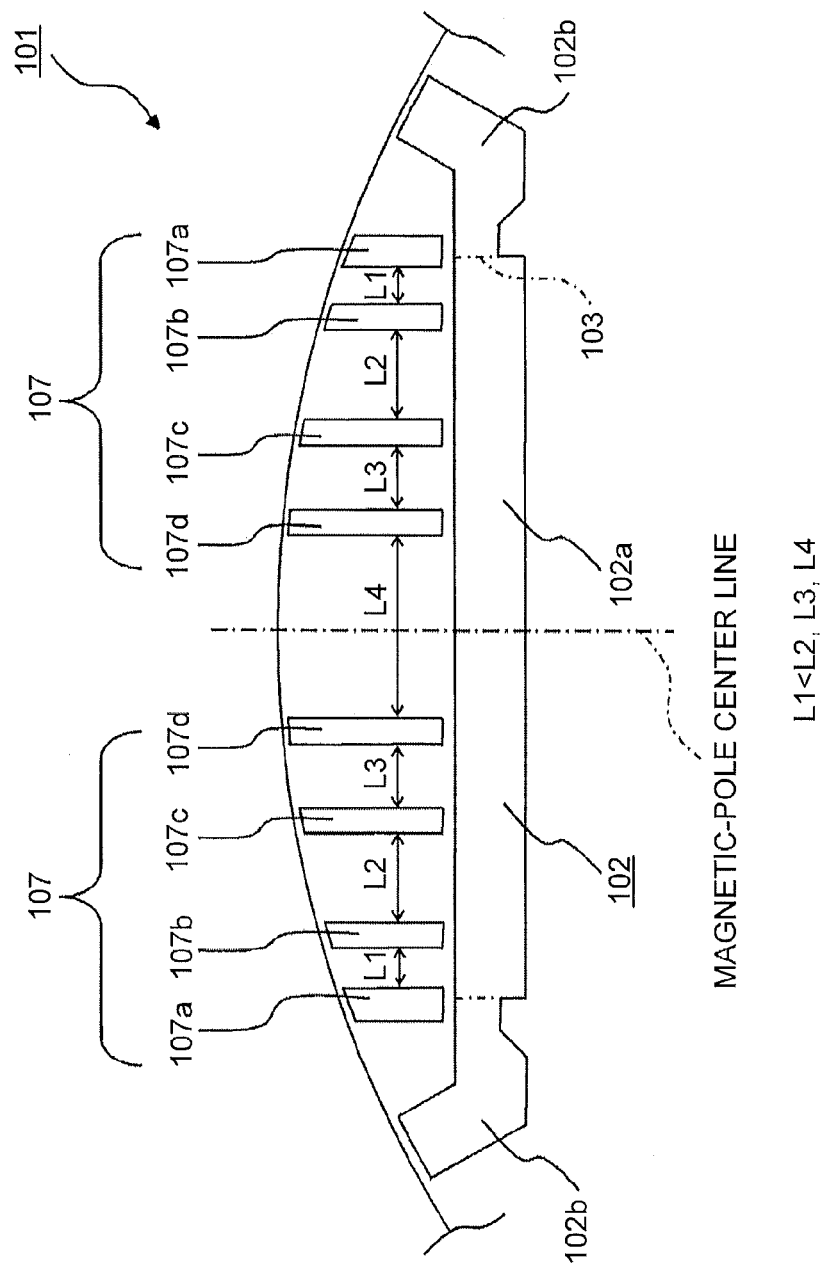
FIG. 10 is an enlarged view of a part Z shown in FIG. 8.
Figure 11:
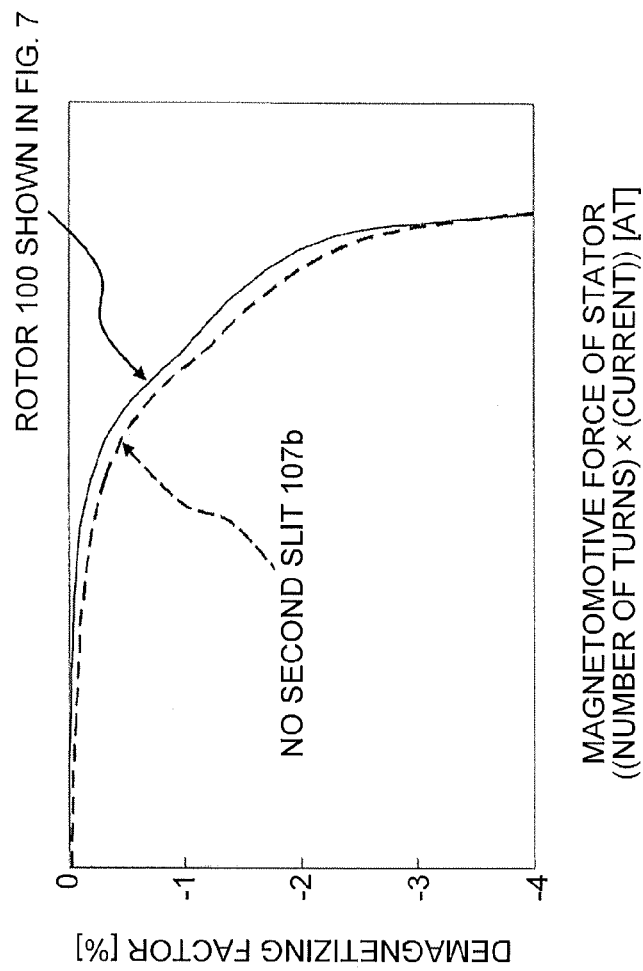
FIG. 11 depicts the first embodiment, and represents a result of comparing a demagnetizing factor [%] relative to a magnetomotive force ((number of turns)×(current)) [AT] of a stator of the rotor 100 shown in FIG. 7 with that of the rotor 100 in which slits 107b are not present.
Figure 12:
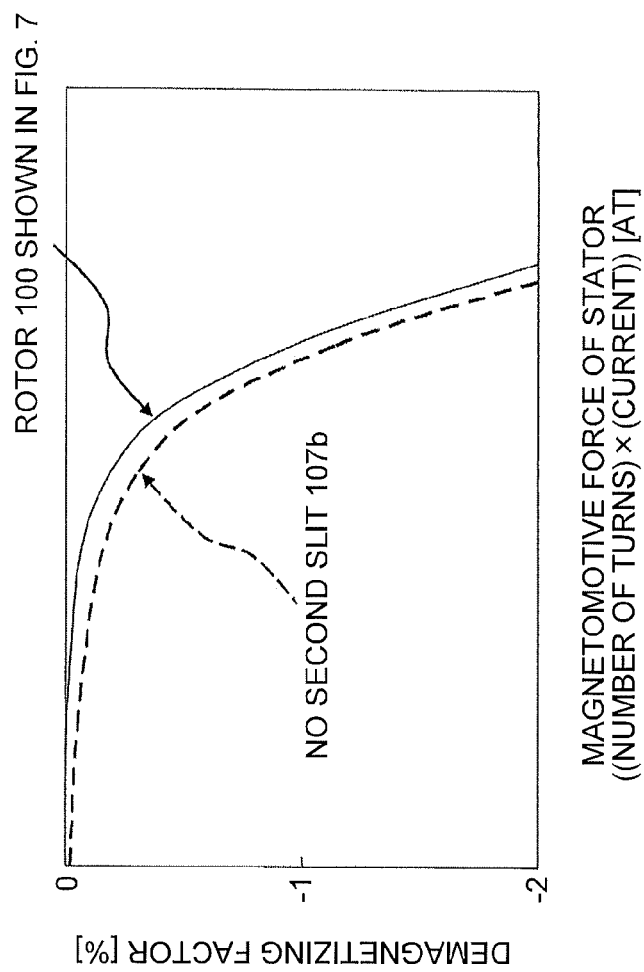
FIG. 12 depicts characteristics of a demagnetizing factor of −2% or higher shown in FIG. 11.
Figure 13:
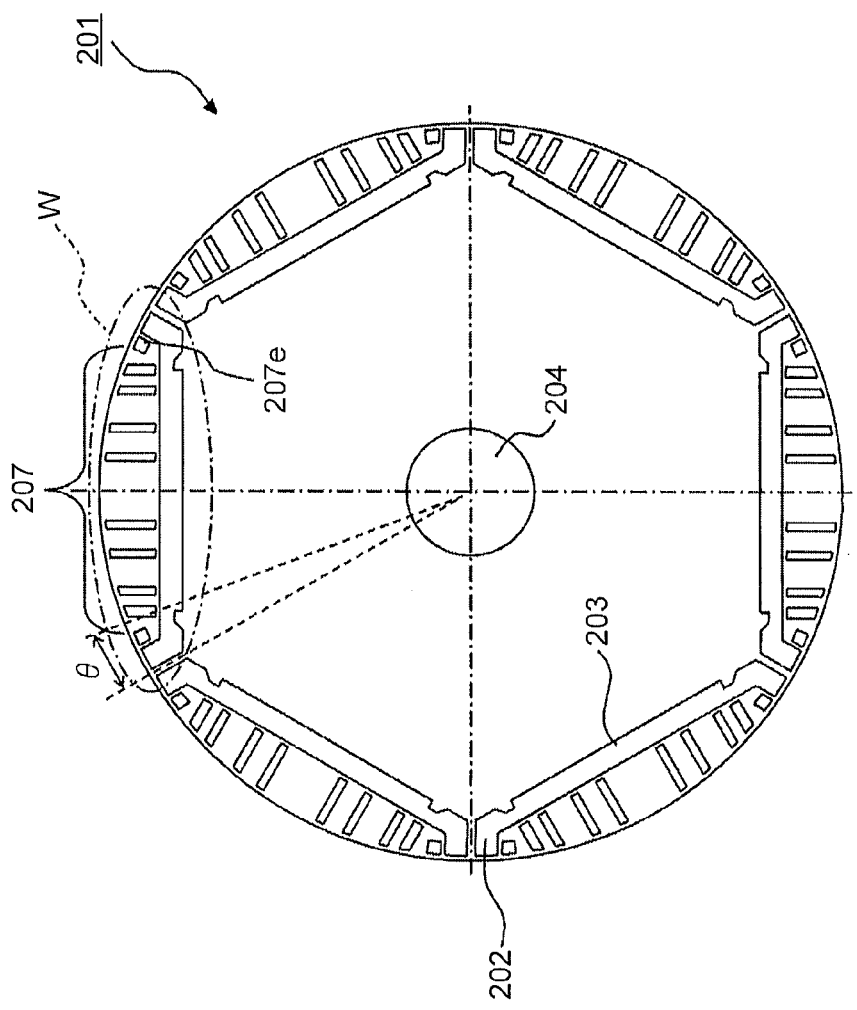
FIG. 13 is a horizontal sectional view of a rotor 200 of a permanent magnet embedded motor according to a first modification, which depicts the first embodiment.
Figure 14:
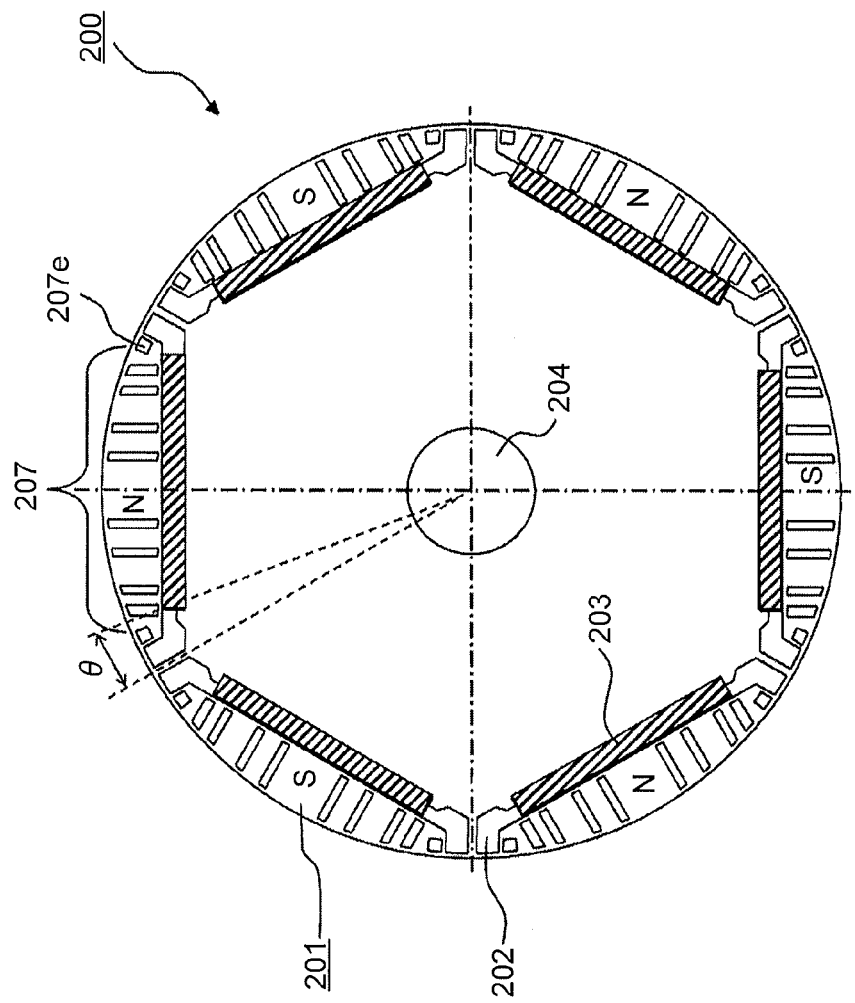
FIG. 14 is a horizontal sectional view of a rotor iron core 201 shown in FIG. 13.
Figure 15:
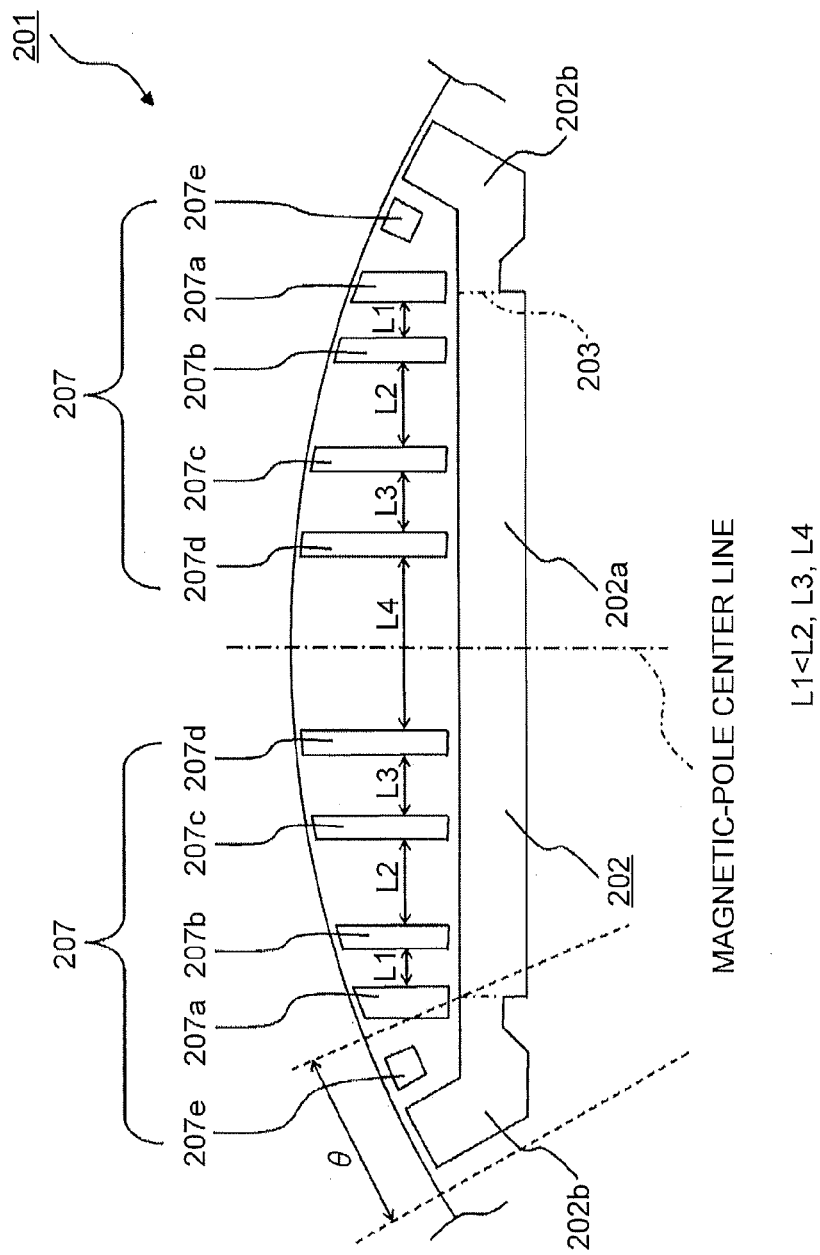
FIG. 15 is an enlarged view of a part W shown in FIG. 14.
Figure 16:
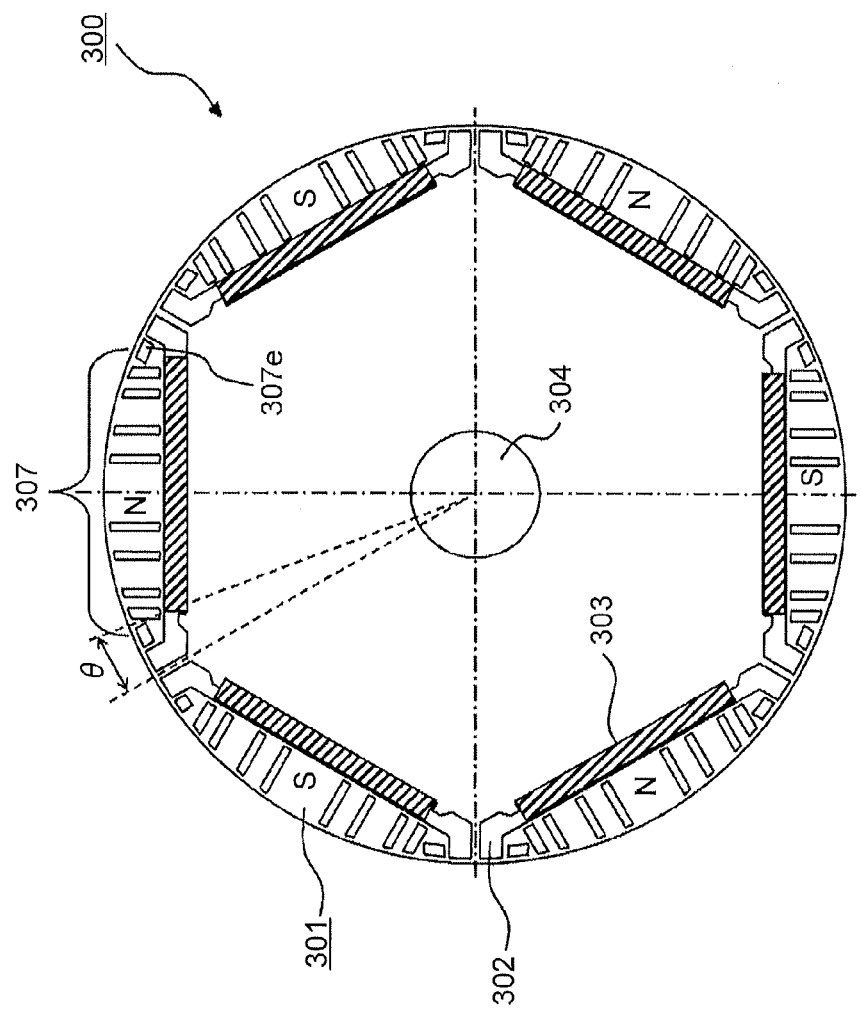
FIG. 16 is a horizontal sectional view of a rotor 300 of a permanent magnet embedded motor according to a second modification, which depicts the first embodiment.
Figure 17:
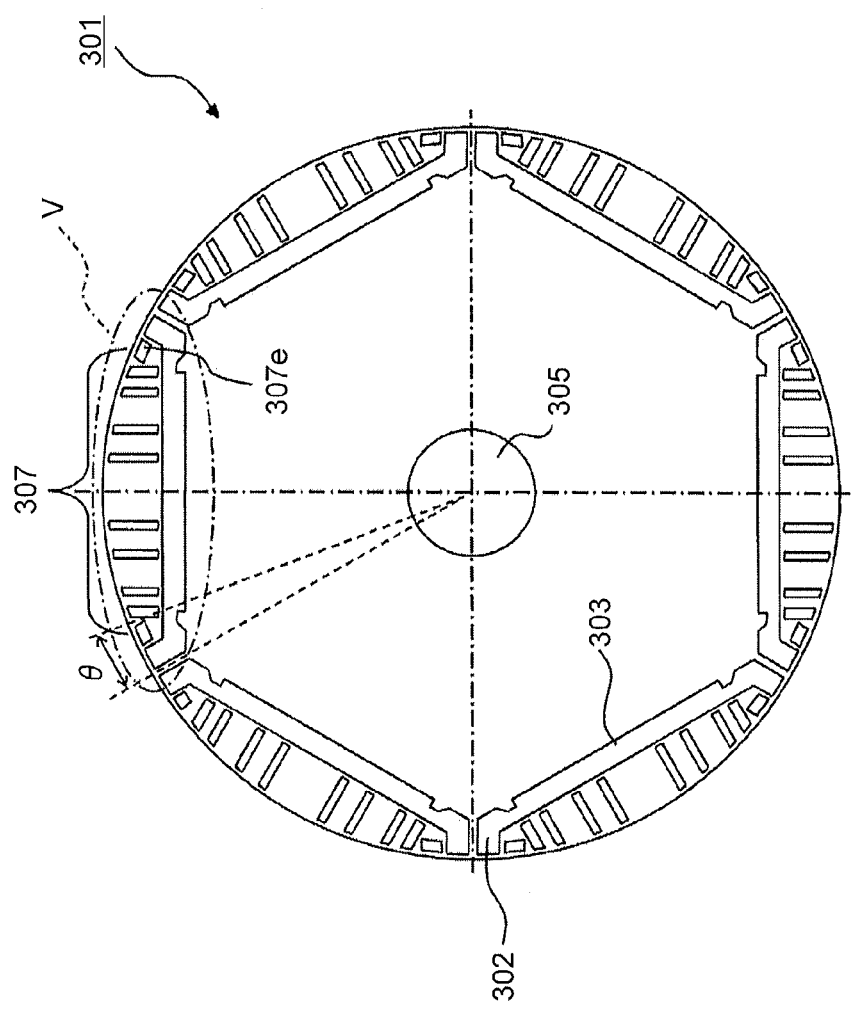
FIG. 17 is a horizontal sectional view of a rotor iron core 301 shown in FIG. 16.
Figure 18:
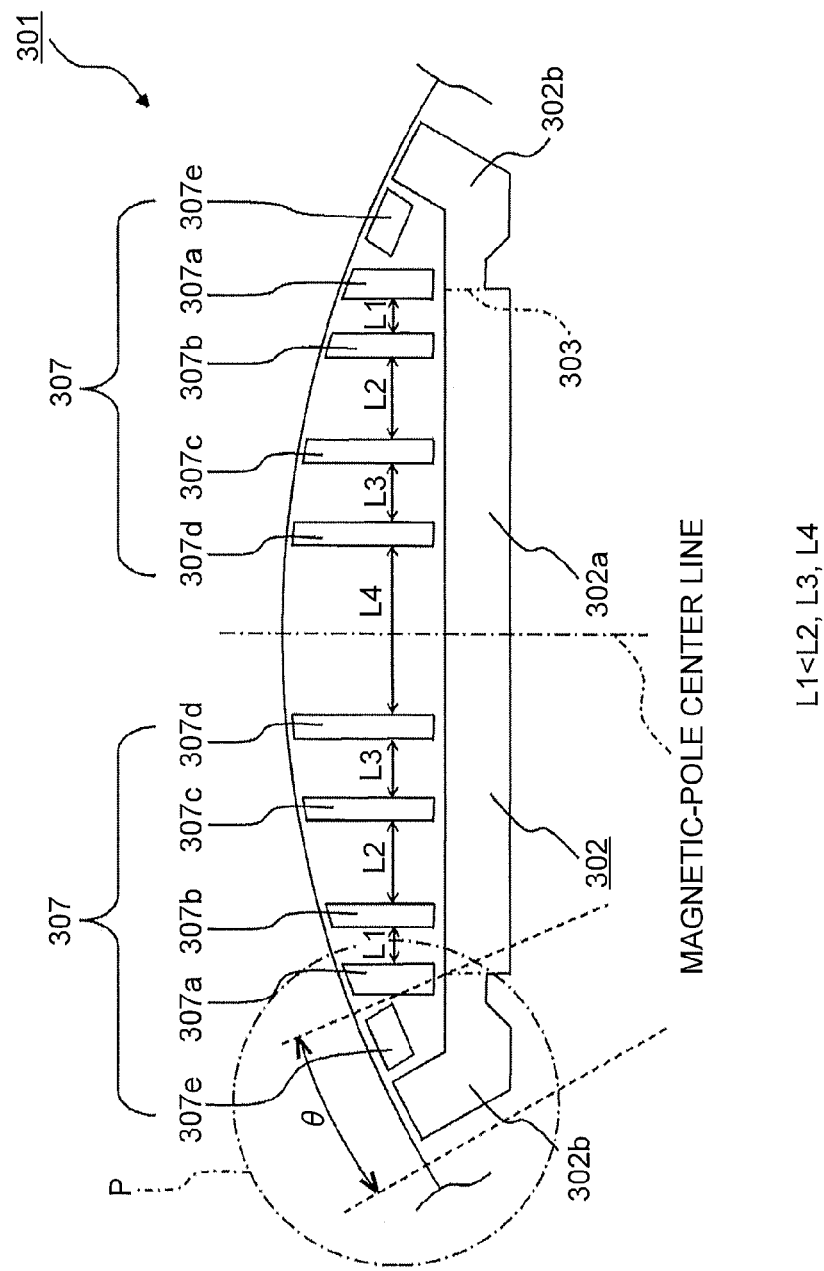
FIG. 18 is an enlarged view of a part V shown in FIG. 17.
Figure 19:
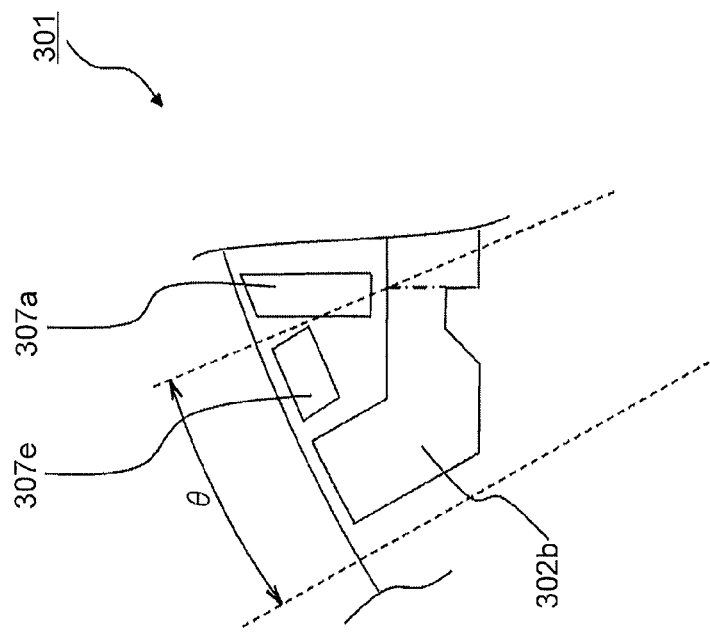
FIG. 19 is an enlarged view of a part P shown in FIG. 18.

FIGS. 7 to 19 depict a first embodiment of the present invention, where FIG. 7 is a horizontal sectional view of a rotor 100 of a permanent magnet embedded motor, FIG. 8 is a horizontal sectional view of a rotor iron core 101 shown in FIG. 7, FIG. 9 is an enlarged view of a part Y shown in FIG. 7, FIG. 10 is an enlarged view of a part Z shown in FIG. 8, FIG. 11 depicts a result of comparing a demagnetizing factor [%] relative to a magnetomotive force ((number of turns)× (current)) [AT] of a stator of the rotor 100 shown in FIG. 7 with that of the rotor 100 in which slits 107b are not present, FIG. 12 depicts characteristics of the demagnetizing factor of −2% or higher shown in FIG. 11, FIG. 13 is a horizontal sectional view of a rotor 200 of a permanent magnet embedded motor according to a first modification, FIG. 14 is a horizontal sectional view of a rotor iron core 201 shown in FIG. 13, FIG. 15 is an enlarged view of a part W shown in FIG. 14, FIG. 16 is a horizontal sectional view of a rotor 300 of a permanent magnet embedded motor according to a second modification, FIG. 17 is a horizontal sectional view of a rotor iron core 301 shown in FIG. 16, FIG. 18 is an enlarged view of a part V shown in FIG. 17, and FIG. 19 is an enlarged view of a part P shown in FIG. 18.

The rotor 100 of the permanent magnet embedded motor according to the first embodiment is explained with reference to FIGS. 7 to 10. The rotor 100 includes at least the rotor iron core 101, permanent magnets 103, and a rotary shaft 104.

The rotor 100 of the permanent magnet embedded motor or the like may also be simply referred to as "rotor 100" or "rotor".

An overall cross-sectional shape of the rotor iron core 101 is a substantially circular shape, and the rotor iron core 101 is formed by punching thin magnetic steel sheets (for example, non-oriented magnetic steel sheets each of which has a thickness of about 0.1 to 1.0 millimeter (and in which a crystal orientation of each of the crystals is arranged as random as possible so as not to exhibit magnetic characteristics in a specific direction of the steel sheets)) into predetermined shapes by means of a metal mold, and by stacking a predetermined number of (a plurality of) the magnetic steel sheets.

Six flat-plate permanent magnets 103 that are polarized to alternately arrange N and S poles are inserted into magnet inserting portions 102a (see FIG. 10) of permanent-magnet insertion holes 102, respectively, thereby forming the six-pole rotor 100. Furthermore, a shaft hole 105 into which the rotary shaft 104 is fitted is formed in a substantially central portion of the rotor iron core 101.

As the permanent magnets 103, rare-earth permanent magnets that contain, for example, neodymium, iron and boron as main components are used.

As shown in FIG. 10, permanent-magnet end-portion cavities 102b connected to (communicating with) the magnet inserting portion 102a residing at a substantial center of each of the permanent-magnet insertion holes 102 are formed on respective sides of the magnet inserting portion 102a. Each of the permanent-magnet end-portion cavities 102b suppresses leakage flux from the permanent magnet 103 in an interpolar portion (a gap between magnetic poles formed by adjacent permanent magnets 103 or a gap between adjacent permanent-magnet insertion holes 102).

As shown in FIG. 10, a plurality of slits 107 (first slits 107a, second slits 107b, third slits 107c, and fourth slits 107d, which are arranged bilaterally symmetrically about a magnetic-pole center line) are formed in an outer-peripheral side iron core portion of each of the permanent-magnet insertion holes 102. The slits 107 or the like are often simply referred to as "slits".

The slits 107 are defined as follows. That is, (1) The first slit 107a: located near the end portions of each of the permanent magnet 103 (near the permanent-magnet end-portion cavities 102b or near the interpolar portions), and present in a radial direction of an end surface 103a of the end portion of the permanent magnet 103;

(2) The second slit 107b: located closer to the center of each magnetic pole than the first slit 107a by a distance L1 from the first slit 107a;

(3) The third slit 107c: located closer to the center of the magnetic pole than the second slit 107b by a distance L2 from the second slit 107b; and (4) The fourth slit 107d: located closer to the center of the magnetic pole than the third slit 107c by a distance L3 from the third slit 107c.

On one magnetic pole, the first slits 107a, the second slits 107b, the third slits 107c and the fourth slits 107d are arranged bilaterally symmetrically. A distance between the two fourth slits 107d is L4.

In the rotor 100 shown in FIG. 7, the permeance decreases and the demagnetization resistance decreases in the end portions of each of the permanent magnets 103 as described above because the first slits 107a are present in the end portions of the permanent magnet 103 (near the permanent-magnet end-portion cavities 102b or near the interpolar portions).

The rotor iron core 101 is configured so that each of the second slits 107b is arranged on a side of each of the first slits 107a closer to the center of each magnetic pole, and that the distance L1 between the first slit 107a and the second slit 107b is set smaller than the distance L2 between the second slit 107b and the third slit 107c, the distance L3 between the third slit 107c and the fourth slit 107d, and the distance L4 between the two fourth slits 107d. That is, the distances L1, L2, L3, and L4 satisfy a relation of L1<L2, L3, and L4.

Furthermore, it is assumed that the distance L1 between the first slit 107a and the second slit 107b is the smallest even if the distances between the slits 107 (the distance L1 between the first slit 107a and the second slit 107b, the distance L2 between the second slit 107b and the third slit 107c, the distance L3 between the third slit 107c and the fourth slit 107d, and the distance L4 between the two fourth slits 107d) are non-uniform.

By setting the distances L1, L2, L3, and L4 to satisfy the relation of L1<L2, L3, and L4, the degree to which the magnetic flux flows is the lowest between the first slit 107a and the second slit 107b among those between the slits (between the first slit 107a and the second slit 107b, between the second slit 107b and the third slit 107c, between the third slit 107c and the fourth slit 107d, and between the two fourth slits 107d).

The low degree to which the magnetic flux flows means that it is also possible to reduce a magnetic field from the stator that is applied to each of the permanent magnets 103. Therefore, as a result of the setting of L1<L2, L3, and L4, it is made difficult for the magnetic field from the stator to pass through the end portions of the permanent magnets 103, and the demagnetization resistance improves.

FIGS. 11 and 12 depict results of comparing the demagnetizing factor [%] relative to the magnetomotive force ((number of turns)×(current)) [AT] of the stator of the rotor 100 shown in FIG. 7 with that of the rotor 100 in which the second slits 107b are not present. FIG. 12 depicts a part of FIG. 11 for facilitating visualization.

Note that the "demagnetizing factor" represents a decrement in the amount of magnetic flux of a permanent magnet after the demagnetization with respect to that of the permanent magnet before the demagnetization. For example, −1% in the graphs (FIGS. 11 and 12) means that the amount of magnetic flux of the permanent magnet 103 decreases by 1%. Therefore, this means that the demagnetization resistance is higher at the demagnetizing factor that is closer to zero at the same magnetomotive force ((number of turns)×(current)) of the stator.

FIGS. 11 and 12 indicate that the rotor 100 shown in FIG. 7 has higher demagnetization resistance when the rotor 100 includes the second slits 107b.

Generally, the demagnetization resistance is likely to decrease when the number of slits provided in the outer-peripheral side iron core portion of each of the permanent magnets increases. However, it is understood that the second slits 107b according to the present embodiment can conversely contribute to improving the demagnetization resistance of each permanent magnet 103. That is, it is defined as follows.

(1) The distance between the first slit 107a and the second slit 107b is L1;

(2) The distance between the second slit 107b and the third slit 107c is L2;

(3) The distance between the third slit 107c and the fourth slit 107d is L3; and (4) The distance between the two fourth slit 107d is L4.

Based on this definition, the demagnetization resistance improves because it is made difficult to apply the opposing magnetic field from the stator to the end portions of each of the permanent magnets 103 by providing the slits in the portions that satisfy the relation of L1<L2, L3, and L4.

Based on the above definition, it can be confirmed that the magnetization resistance improves even if the slits 107 (the first slits 107a, the second slits 107b, the third slits 107c, and the fourth slits 107d) are provided in the outer-peripheral side iron core portion of each of the permanent-magnet insertion holes 102 by setting the distance L1 between the first slit 107a in the end portions of the permanent magnets 103 and the second slit 107b located closer to the center of the magnetic pole than the first slit 107a to be smaller than the distances L2, L3, and L4 between the other slits (the second slits 107b, the third slits 107c, and the fourth slits 107d).

Furthermore, it is preferable that the slits 107 (the first slits 107a, the second slits 107b, the third slits 107c, and the fourth slits 107d) present in the radial direction of each of the permanent magnets 103 are substantially perpendicular to the permanent magnet 103. When the slits 107 are inclined, then the distances between the slits 107 in the circumferential direction are often reduced, and magnetic saturation is likely to occur. Therefore, by arranging the slits 107 to be substantially perpendicular to each of the permanent magnets 103, the slits 107 are formed into the shapes such that the distances between the slits 107 are substantially constant and that it is made difficult to cause the magnetic saturation.

Alternatively, similar effects can be exhibited by setting the distance L1 between the first slit 107a and the second slit 107b near the end portions of each of the permanent magnets 103 to be substantially constant even though the slits 107 (the first slits 107a, the second slits 107b, the third slits 107c, and the fourth slits 107d) present in the radial direction of the permanent magnet 103 are not substantially perpendicular to the permanent magnet 103.

It is preferable that the distance L1 between the first slit 107a and the second slit 107b near the end portions of each of the permanent magnets 103 is equal to or larger than the thickness (about 0.1 to 1.0 millimeter, for example) of each of the magnetic steel sheets that constitute the rotor 100 and equal to or smaller than a thickness T (see FIG. 9) of the permanent magnet 103 in the radial direction. That is, the distance L1 satisfies a relation of (Thickness of magnetic steel sheet) $\leq L1 \leq T$.

The magnetic steel sheets are punched by means of the metal mold when the rotor iron core 101 is manufactured. Generally, it is preferable that a thickness of a thin portion is equal to or larger than the thickness of each magnetic steel sheet, and that the distance L1 between the first slit 107a and the second slit 107b near the end portions of each of the permanent magnets 103 is also equal to or larger than the thickness of each magnetic steel sheet.

Furthermore, if the distance L1 between the first slit 107a and the second slit 107b near the end portions of each of the permanent magnets 103 is made larger than the thickness T of the permanent magnet 103 in the radial direction, a demagnetizing-field depression effect of the second slit 107b on the end portion of the permanent magnet 103 becomes smaller. Therefore, it is preferable that the distance L1 between the first slit 107a and the second slit 107b near the end portion of the permanent magnet 103 is equal to or smaller than the thickness T of the permanent magnet 103 in the radial direction.

Further, the slits 107 according to the present embodiment are intended as the slits 107 that are present in the radial direction of each of the permanent magnets 103. That is, the slits 107 according to the present embodiment are present within a range of an angle α (see FIG. 7) formed between a line that passes through a center of the rotor 100 shown in FIG. 7 and one of the end portions of the permanent magnet 103 and a line that passes through the center of the rotor 100 and the other end portion of the permanent magnet 103.

Based on the above configurations, the rotor 100 is configured based on the following definitions.

(1) Providing that the distance between the first slit 107a and the second slit 107b is L1, the distance between the second slit 107b and the third slit 107c is L2, the distance between the third slit 107c and the fourth slit 107d is L3, and that the distance between the two fourth slit 107d is L4, the distances L1, L2, L3, and L4 satisfy the relation of L1<L2, L3, and L4.

(2) Providing that the thickness of each of the permanent magnets 103 in the radial direction is T, the distance L1 satisfies the relation of (Thickness of magnetic steel sheet) $\leq L1 \leq T$.

(3) The slits 107 are present within the range of the angle α formed between the line that passes through the center of the rotor 100 shown in FIG. 7 and one of the end portions of the permanent magnet 103 and the line that passes through the center of the rotor 100 and the other end portion of the permanent magnet 103.

(4) The slits 107 are substantially perpendicular to the permanent magnet 103, or the distance L1 between the first slit 107a and the second slit 107b is made substantially constant.

With this configuration, the demagnetization resistance can improve even if the slits 107 (the first slits 107a, the second slits 107b, the third slits 107c, and the fourth slits 107d, for example) are provided in the outer-peripheral side iron core portion of each of the permanent-magnet insertion holes 102 so as to reduce the torque ripple and noise.

As shown in FIG. 7, because each of the first slits 107a is present in the radial direction of the end surface 103a of each of the end portions of each of the permanent magnets 103, the permeance decreases in the end portion of the permanent magnet 103, but the demagnetizing field applied particularly to corners of the end portion of the permanent magnet 103 can be reduced. Accordingly, by arranging the first slit 107a in the radial direction of the end surface 103a of the end portion of the permanent magnet 103, it is possible to improve the demagnetization resistance. It is also possible to exhibit a greater effect by combining this arrangement with the above-described relation of L1<L2, L3, and L4 and that of (thickness of magnetic steel sheet) $\leq L1 \leq T$.

Furthermore, it suffices that only an end portion of each of the first slits 107a near each of the permanent-magnet insertion holes 102 is present in the radial direction of the end surface 103a of the end portion of each of the permanent magnets 103 so as to reduce the demagnetizing field applied particularly to the corners of the end portion of the permanent magnet 103 that are likely to be demagnetized by the presence of the slits. That is, when the portion of the first slit 107a proximate to the permanent-magnet insertion hole is not present in the radial direction of the end surface 103a of the end portion of the permanent magnet 103 and only a portion of the first slit 107a near an outer circumferential side of the rotor 100 is present on the end surface 103a of the end portion of the permanent magnet 103, even though the first slit 107a is present in the radial direction of the end surface 103a of the end portion of the permanent magnet 103, it is impossible to reduce the demagnetizing field applied particularly to the corners of the end portion of the permanent magnet 103 that are likely to be demagnetized and to make the most use of the demagnetizing field depression effect.

The rotor 200 of the permanent magnet embedded motor according to the first modification is explained with reference to FIGS. 13 to 15. The rotor 200 according to the first modification differs from the rotor 100 shown in FIG. 7 in that a substantially rectangular (square, for example) fifth slit 207e (different slit) is provided between each of the end portions of each of the permanent magnets 203 and the interpolar portion in the outer-peripheral side iron core portion outside of each of the permanent-magnet insertion holes 202.

The rotor 200 according to the first modification includes at least the rotor iron core 201, the permanent magnets 203, and a rotary shaft 204.

The rotor 200 of the permanent magnet embedded motor or the like is also simply referred to as "rotor 200" or "rotor".

An overall cross-sectional shape of the rotor iron core 201 is a substantially circular shape, and the rotor iron core 201 is formed by punching magnetic steel sheets (for example, non-oriented magnetic steel sheets each of which has a thickness of about 0.1 to 1.0 millimeter (and in which a crystal orientation of each of the crystals is arranged as random as possible so as not to exhibit magnetic characteristics in a specific direction of each of the steel sheets)) into predetermined shapes by means of a metal mold, and by stacking a predetermined number of (a plurality of) the magnetic steel sheets.

Six flat-plate permanent magnets 203 that are polarized to alternately arrange N and S poles are inserted into magnet inserting portions 202a (see FIG. 15) of permanent-magnet insertion holes 202, respectively, thereby forming the six-pole rotor 200. Furthermore, a shaft hole 205 into which the rotary shaft 204 is fitted is formed in a substantially central portion of the rotor iron core 201.

As the permanent magnets 203, rare-earth permanent magnets that contain, for example, neodymium, iron, and boron as main components are used.

As shown in FIG. 15, permanent-magnet end-portion cavities 202b connected to (communicating with) the magnet inserting portion 202a residing at a substantial center of each of the permanent-magnet insertion holes 202 are formed on respective sides of the magnet inserting portion 202a. Each of the permanent-magnet end-portion cavities 202b suppresses leakage flux from the permanent magnet 203 in an interpolar portion (a gap between magnetic poles formed by adjacent permanent magnets 203 or a gap between adjacent permanent-magnet insertion holes 202).

As shown in FIG. 15, a plurality of slits 207 (first slits 207a, second slits 207b, third slits 207c, fourth slits 207d, and the fifth slits 207e, which are arranged bilaterally symmetrically about a magnetic-core center line) are formed in an outer-peripheral side iron core portion of each of the permanent-magnet insertion holes 202.

The slits 207 are defined as follows. That is,
(1) The first slit 207a: located near the end portions of each of the permanent magnets 203 (near the permanent-magnet end-portion cavities 202b or near the interpolar portions), and present in a radial direction of an end surface of the end portion of the permanent magnet 203;
(2) The second slit 207b: located closer to the center of each magnetic pole than the first slit 207a by the distance L1 from the first slit 207a;
(3) The third slit 207c: located closer to the center of the magnetic pole than the second slit 207b by the distance L2 from the second slit 207b;
(4) The fourth slit 207d: located closer to the center of the magnetic pole than the third slit 207c by the distance L3 from the third slit 207c; and
(5) The fifth slit 207e: provided between the end portion of the permanent magnet 203 and the interpolar portion, and present within a range of an angle θ formed between a line that passes through a center of the rotor 200 and a corner of the end portion of the permanent magnet 203 and a line that passes through the center of the rotor 200 and the interpolar portion.

On one magnetic pole, the fifth slits 207e, the first slits 207a, the second slits 207b, the third slits 207c, and the fourth slits 207d are arranged bilaterally symmetrically. A distance between the two fourth slits 207d is L4.

Similarly to the rotor iron core 101, the rotor iron core 201 is configured so that each of the second slits 207b is arranged on a side of each of the first slits 207a closer to the center of each magnetic pole, and that the distance L1 between the first slit 207a and the second slit 207b is set smaller than the distance L2 between the second slit 207b and the third slit 207c, the distance L3 between the third slit 207c and the fourth slit 207d, and the distance L4 between the two fourth slits 207d. That is, the distances L1, L2, L3, and L4 satisfy the relation of L1<L2, L3, and L4.

The substantially square fifth slit 207e and the permanent-magnet end-portion cavity 202b present within the range of the angle θ formed between the line that passes through the center of the rotor 200 and the corner of the end portions of each of the permanent magnets 203 and the line that passes through the center of the rotor 200 and the interpolar portion shown in FIG. 15 functions to prevent the leakage flux from the permanent magnet 203.

In the rotor iron core 201 shown in FIG. 10, only the permanent-magnet end-portion cavity 102b is present within the range of the angle θ (note that the angle θ is not shown in FIG. 10). In FIG. 15, the fifth slit 207e as well as the permanent-magnet end-portion cavity 202b is provided in the iron core portion (the rotor iron core 201) present within the angle θ, thereby further preventing the leakage of the magnetic flux.

The slits 207 (the first slits 207a, the second slits 207b, the third slits 207c, and the fourth slits 207d) out of the range of the angle θ and present in the radial direction of each of the permanent magnets 203 has mainly an effect of reducing the torque ripple. The fifth slit 207e present within the angle θ has a great effect of reducing the leakage flux.

The rotor 300 of a permanent magnet embedded motor according to the second modification is explained with reference to FIGS. 16 to 19. The rotor 300 according to the second modification differs from the rotor 200 of the permanent magnet embedded motor according to the first modification in a shape of a fifth slit 307e (different slit). The shape of the fifth slit 307e is obtained by making the fifth slit 207e of the rotor 300 according to the second modification longer in the circumferential direction. This can increase the effect of reducing the leakage flux from a permanent magnet 303 and exhibit greater effects.

The rotor 300 according to the second modification includes at least the rotor iron core 301, the permanent magnets 303, and a rotary shaft 304.

The rotor 300 of the permanent magnet embedded motor or the like is also simply referred to as "rotor 300" or "rotor".

An overall cross-sectional shape of the rotor iron core 301 is a substantially circular shape, and the rotor iron core 301 is formed by punching magnetic steel sheets (for example, non-oriented magnetic steel sheets each of which has a thickness of about 0.1 to 1.0 millimeter (and in which a crystal orientation of each of the crystals is arranged as random as possible so as not to exhibit magnetic characteristics in a specific direction of each of the steel sheets)) into predetermined shapes by means of a metal mold, and by stacking a predetermined number of (a plurality of) the magnetic steel sheets. Furthermore, a shaft hole 305 into which the rotary shaft 304 is fitted is formed in a substantially central portion of the rotor iron core 301.

Six flat-plate permanent magnets 303 that are polarized to alternately arrange N and S poles are inserted into magnet inserting portions 302a (see FIG. 18) of permanent-magnet insertion holes 302, respectively, thereby forming the six-pole rotor 300.

As the permanent magnets 303, rare-earth permanent magnets that contain, for example, neodymium, iron, and boron as main components are used, for example.

As shown in FIG. 18, permanent-magnet end-portion cavities 302b connected to (communicating with) the magnet inserting portion 302a residing at a substantial center of each of the permanent-magnet insertion holes 302 are formed on respective sides of the magnet inserting portion 302a. Each of the permanent-magnet end-portion cavities 302b suppresses leakage flux from the permanent magnet 303 in an interpolar portion (a gap between magnetic poles formed by adjacent permanent magnets 303 or a gap between adjacent permanent-magnet insertion holes 302).

Furthermore, as shown in FIG. 18, a plurality of slits 307 (first slits 307a, second slits 307b, third slits 307c, fourth slits 307d, and the fifth slits 307e, which are arranged bilaterally symmetrically about a magnetic-pole center line) are formed in an outer-peripheral side iron core portion of each of the permanent-magnet insertion holes 302.

The slits 307 are defined as follows. That is,
(1) The first slit 307a: located near the end portions of each of the permanent magnets 303 (near the permanent-magnet end-portion cavities 302b or near the interpolar portions), and present in a radial direction of an end surface of the end portion of the permanent magnet 303;

(2) The second slit 307*b*: located closer to the center of each magnetic pole than the first slit 307*a* by the distance L1 from the first slit 307*a*;

(3) The third slit 307*c*: located closer to the center of the magnetic pole than the second slit 307*b* by the distance L2 from the second slit 307*b*;

(4) The fourth slit 307*d*: located closer to the center of the magnetic pole than the third slit 307*c* by the distance L3 from the third slit 307*c*; and (5) The fifth slit 307*e*: provided between the end portion of the permanent magnet 303 and the interpolar portion, and present within the range of the angle θ formed between a line that passes through a center of the rotor 300 and a corner of the end portion of the permanent magnet 303 and a line that passes through the center of the rotor 300 and the interpolar portion.

On one magnetic pole, the fifth slits 307*e*, the first slits 307*a*, the second slits 307*b*, the third slits 307*c*, and the fourth slits 307*d* are arranged bilaterally symmetrically. A distance between the two fourth slits 307*d* is L4.

Similarly to the rotor iron core 101, the rotor iron core 301 is configured so that each of the second slits 307*b* is arranged on a side of each of the first slits 307*a* closer to the center of each magnetic pole, and that the distance L1 between the first slit 307*a* and the second slit 307*b* is set smaller than the distance L2 between the second slit 307*b* and the third slit 307*c*, the distance L3 between the third slit 307*c* and the fourth slit 307*d*, and the distance L4 between the two fourth slits 307*d*. That is, the distances L1, L2, L3, and L4 satisfy the relation of L1<L2, L3, and L4.

The fifth slit 307*e* that has a substantially rectangular (long in the circumferential direction) cross-section and the permanent-magnet end-portion cavity 302*b* that are present within the range of the angle θ formed between the line that passes through the center of the rotor 300 and the corner of the end portions of the permanent magnet 303 and the line that passes through the center of the rotor 300 and the interpolar portion shown in FIG. 18 functions to prevent the leakage flux from the permanent magnet 303.

In the rotor iron core 101 shown in FIG. 10, only the permanent-magnet end-portion cavity 102*b* is present within the range of the angle θ (note that the angle θ is not shown in FIG. 10). In FIG. 18, the fifth slit 307*e* that has the substantially rectangular (circumferentially long) cross-section as well as the permanent-magnet end-portion cavity 302*b* is provided in the iron core portion (the rotor iron core 301) present within the angle θ. This can improve the effect of reducing the leakage flux, further improve the inductive voltage, and effectively improve efficiency.

In other words, however, to provide the slit (the fifth slit 307*e*, for example) within the angle θ means to form the slit into a shape that further prevents the magnetic field from the stator from leaking and that causes the magnetic field to be applied to the permanent magnet 303. That is, the slit within the angle θ reduces the demagnetization resistance.

Due to this fact, the shape that satisfies the relation of L1<L2, L3, and L4 and that of (thickness of magnetic steel sheet) ≤L1≤T is combined with the shape of forming the slit within the angle θ, thereby to improve the demagnetization resistance that is reduced by the slit within the angle θ. Furthermore, when the slit (the fifth slit 307*e*, for example) within the angle θ is circumferentially long, it is possible to further prevent the leakage flux, but the demagnetization resistance further degrades. Therefore, by combining the shape that satisfies the relation of L1<L2, L3, and L4 and that of (thickness of magnetic steel sheet) ≤L1≤T with the shape of the slit provided within the angle θ, the reduced demagnetization resistance can be improved. Note that sign T denotes a thickness of the permanent magnet 303 (similarly to sign T in FIG. 9).

Figure 20:
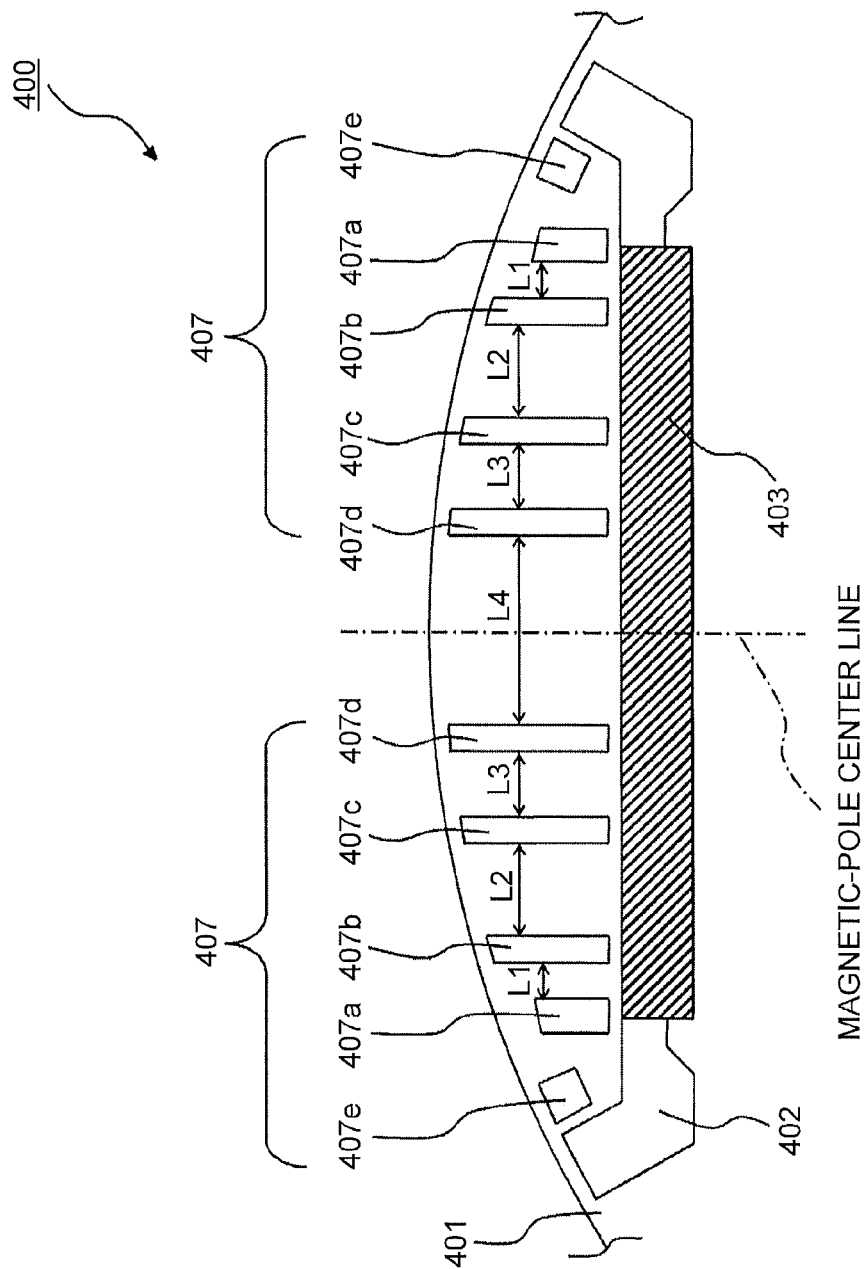
FIG. 20 is a partial horizontal sectional view of a rotor 400 of a permanent magnet embedded motor according to a third modification, which depicts the first embodiment.
Figure 21:
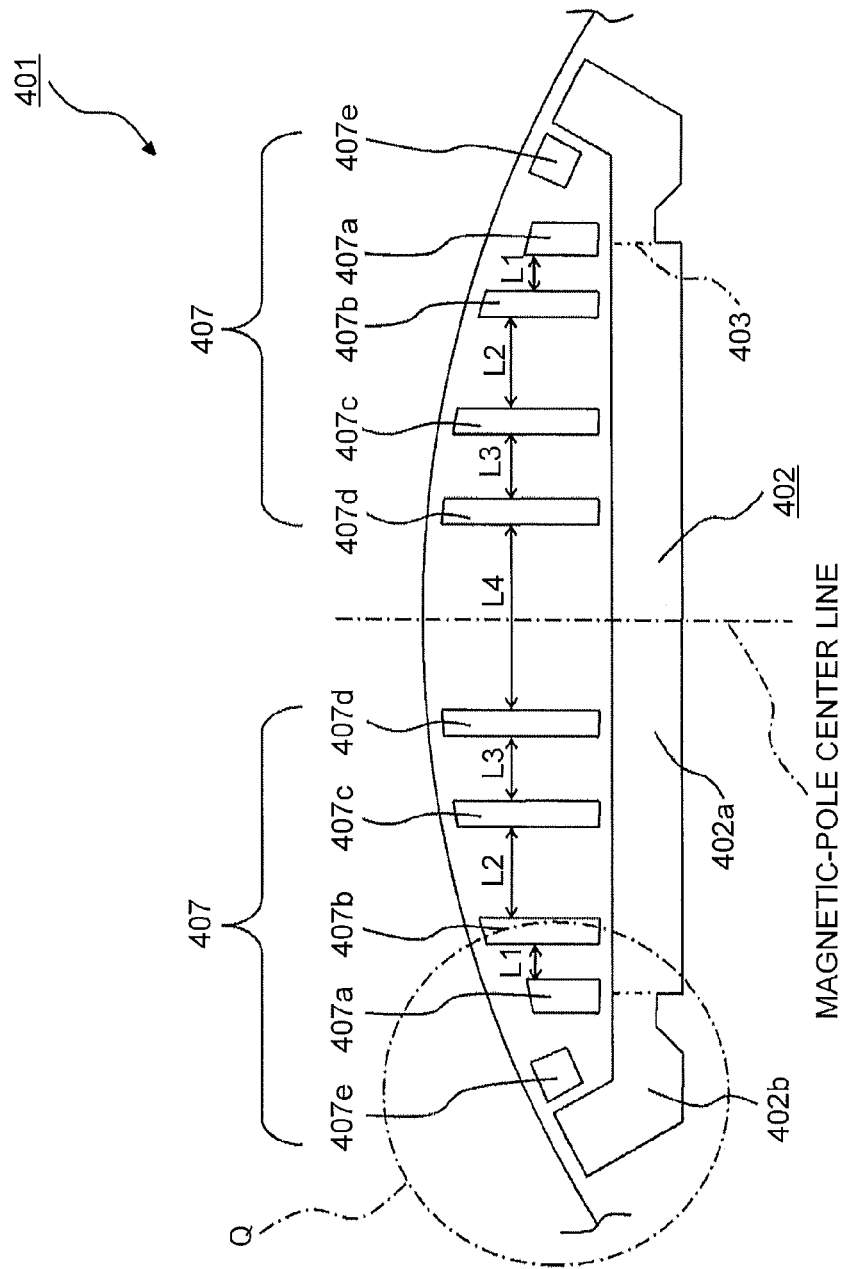
FIG. 21 is a horizontal sectional view of a rotor iron core 401 shown in FIG. 20, which depicts the first embodiment.
Figure 22:
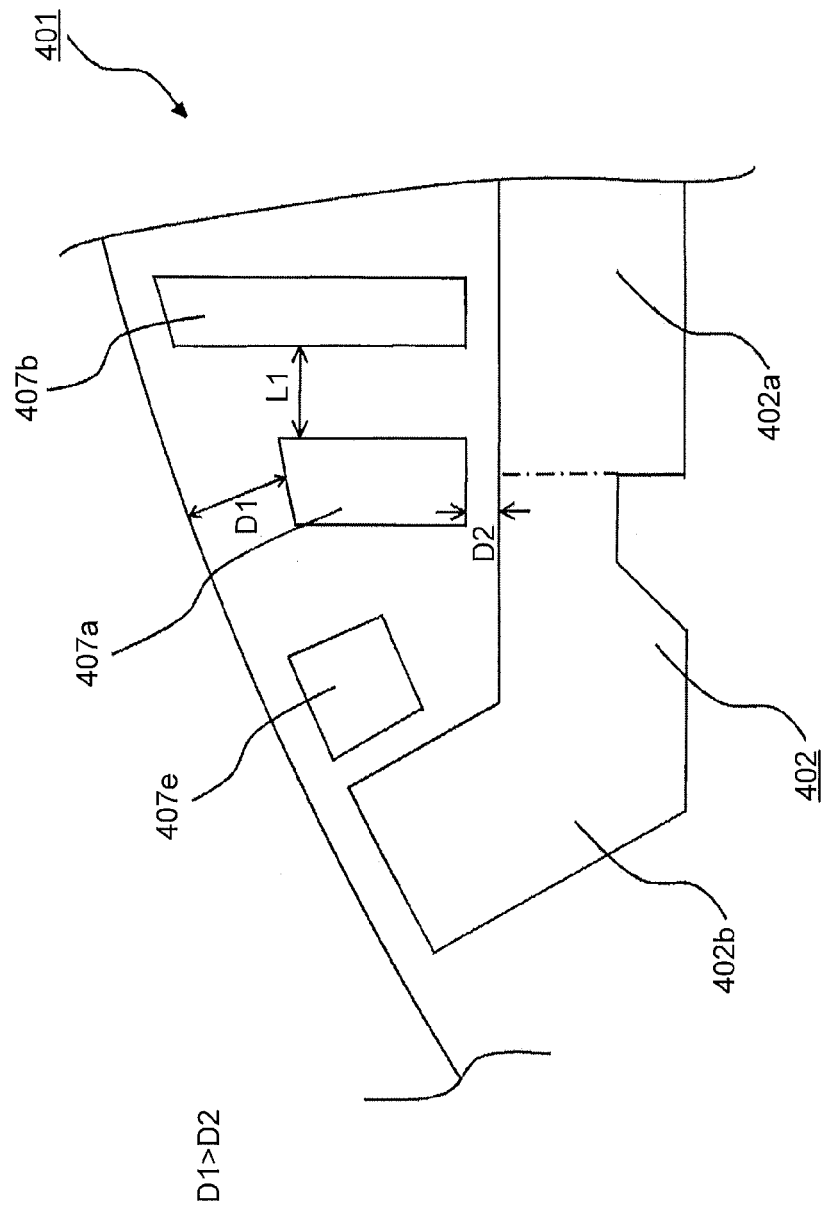
FIG. 22 is an enlarged view of a part Q shown in FIG. 21.

FIGS. 20 to 22 depict the first embodiment, where FIG. 20 is a partial horizontal sectional view of a rotor 400 of a permanent magnet embedded motor according to a third modification, FIG. 21 is a horizontal sectional view of a rotor iron core 401 shown in FIG. 20, and FIG. 22 is an enlarged view of a part Q shown in FIG. 21.

The rotor 400 of the permanent magnet embedded motor according to the third modification is explained with reference to FIGS. 20 to 22. The rotor 400 according to the third modification differs from the rotor 200 of the permanent magnet embedded motor according to the first modification or the rotor 300 of the permanent magnet embedded motor according to the second modification in slits 407 present in an outer-peripheral side iron core portion of (in the radial direction of) each of permanent magnets 403. That is, the rotor 400 according to the third modification differs from the rotor 200 according to the first modification or the rotor 300 according to the second modification in the slits 407 that are present within the range of the angle α (see FIG. 7) formed between a line that passes through a center of the rotor 400 and one of end portions of the permanent magnet 403 and a line that passes through the center of the rotor 400 and the other end portion of the permanent magnet 403.

As shown in FIG. 20, the slits 407 (first slits 407*a*, second slits 407*b*, third slits 407*c*, fourth slits 407*d*, and fifth slits 407*e*, which are arranged bilaterally symmetrically about a magnetic-pole center line) are formed in the outer-circumferential core portion of each of permanent-magnet insertion holes 402.

The slits 407 are defined as follows. That is, (1) The first slit 407*a*: located near the end portions of each of the permanent magnets 403 (near the permanent-magnet end-portion cavities 402*b* or near the interpolar portions), and present in a radial direction of an end surface of the end portion of the permanent magnet 403;

(2) The second slit 407*b*: located closer to the center of each magnetic pole than the first slit 407*a* by the distance L1 from the first slit 407*a*;

(3) The third slit 407*c*: located closer to the center of the magnetic pole than the second slit 407*b* by the distance L2 from the second slit 407*b*;

(4) The fourth slit 407*d*: located closer to the center of the magnetic pole than the third slit 407*c* by the distance L3 from the third slit 407*c*; and (5) The fifth slit 407*e*: provided between the end portion of the permanent magnet 403 and the interpolar portion, and present within the range of the angle θ formed between the line that passes through the center of the rotor 400 and the end portion of the permanent magnet 403 and the line that passes through the center of the rotor 400 and the interpolar portion (similarly to FIG. 19).

The difference of the rotor 400 of the permanent magnet embedded motor according to the third modification from the rotor 200 of the permanent magnet embedded motor according to the first modification or the rotor 300 of the permanent magnet embedded motor according to the second modification resides in that a distance D1 between each of the first slits 407*a* (except for the second slits 407*b* to the fifth slits 407*e*) and an outer circumference of the rotor 400 is larger than a distance D2 between the first slit 407*a* and the permanent-magnet insertion hole 402. That is, the relation between the distances D1 and D2 is D1>D2.

As described above, the demagnetization of each of the permanent magnets 403 is more likely to occur in the end portions of the permanent magnet 403. Accordingly, the first slits 407a cause the degradation in the demagnetization resistance, but it is possible to improve the reduced demagnetization resistance by the combination of the arrangement with the shape that satisfies the relation of L1<L2, L3, and L4 and that of (thickness of magnetic steel sheet) ≤L1≤T.

The rotor 400 of the permanent magnet embedded motor according to the third modification shown in FIGS. 20 to 22 can further improve the reduced demagnetization resistance as compared with the rotor 200 of the permanent magnet embedded motor according to the first modification or the rotor 300 of the permanent magnet embedded motor according to the second modification.

The distance D1 between each of the first slits 407a (except for the second slits 407b to the fifth slits 407e) and the outer circumference of the rotor 400 is made larger than the distance D2 between the first slit 407a and the permanent-magnet insertion hole 402, thereby making it easier for the demagnetizing field that is to be applied to the permanent magnet 403 to pass through the first slit 407a and the outer circumference of the rotor 400.

Accordingly, it is made difficult to apply the demagnetizing field to the permanent magnet 403. As a result, the demagnetizing field from the stator that is supposed to be applied to the permanent magnet 403 passes through the first slit 407a and the outer circumference of the rotor 400 and is not applied to the permanent magnet 403. Therefore, the demagnetization resistance of the permanent magnet 403 improves.

Figure 23:
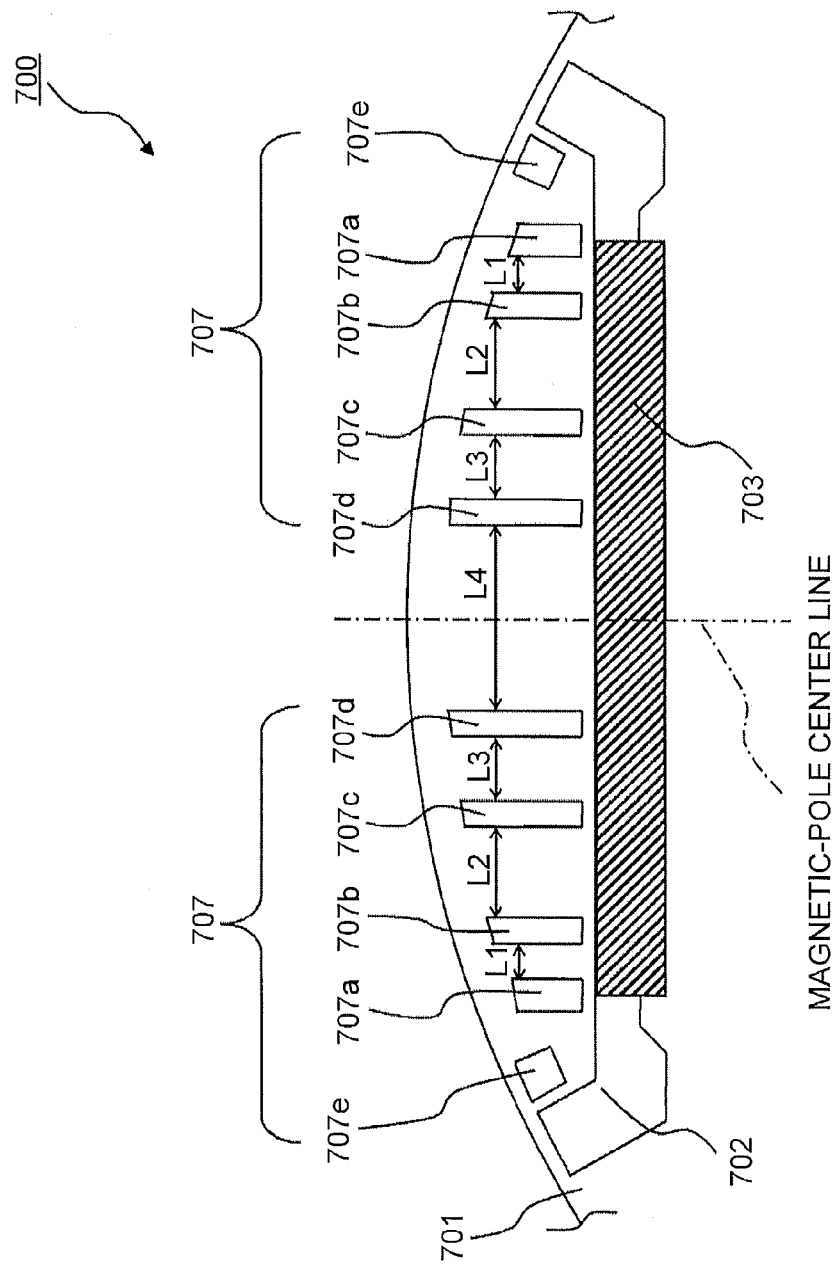
FIG. 23 is a partial horizontal sectional view of a rotor 700 of a permanent magnet embedded motor according to a fourth modification, which depicts the first embodiment.

FIGS. 23 to 25 depict the first embodiment, where FIG. 23 is a partial horizontal sectional view of a rotor 700 of a permanent magnet embedded motor according to a fourth modification, FIG. 24 is a horizontal sectional view of a rotor iron core 701 shown in FIG. 23, and FIG. 25 is an enlarged view of FIG. 24.

FIGS. 23 to 25 depict the rotor 700 configured so that distances (D1a, D1b, D1c, and D1d) between a first slit 707a to a fourth slit 707d (except for a fifth slit 707e) and an outer circumference of the rotor 700 are larger than distances (D2a, D2b, D2c, and D2d) between the first slit 707a to the fourth slit 707d and a permanent-magnet insertion hole 702. That is, the distances D1a, D1b, D1c and D1d, and D2a, D2b, D2c and D2d satisfy relations of D1a>D2a, D1b>D2b, D1c>D2c, and D1d>D2d.

The demagnetization of each of permanent magnets 703 is likely to occur in end portions of the permanent magnet 703. However, because the permeance also decreases in parts in which slits 707 are present even in a central portion of the permanent magnet 703, the demagnetization is more likely to occur in these parts than parts in which the slits 707 are not present. Accordingly, as for a second slit 707b to the fourth slit 707d that are the slits 707 present in the portions other than the slits 707 present in the end portion of the permanent magnet 703, the demagnetization resistance can be improved by making the distances between the second slit 707b to the fourth slit 707d and the outer circumference of the rotor 700 larger than the distances between the second slit 707b to the fourth slit 707d and the permanent-magnet insertion holes 702.

Moreover, by increasing the distances between the slits 707 and the outer circumference of the rotor 700, the magnetic saturation can be relaxed in these portions. A magnetic flux distribution in an outer circumferential portion of the rotor 700 will be a waveform that includes harmonic components because of the influence of the magnetic saturation between the slits 707 and the outer circumferential portion of the rotor 700. As a result, the harmonic components of the inductive voltage increase and the cogging torque also increases. This disadvantageously causes an increase in the torque ripple and noise.

Accordingly, by increasing the distances between the slits 707 and the outer circumference of the rotor 700, it is made possible to lessen the magnetic saturation and reduce the harmonic components of the magnetic flux distribution on the outer circumferential portion of the rotor. Therefore, it is possible to reduce the torque ripple because of effects of reducing the harmonic components of the inductive voltage and reducing the cogging torque, and as a consequence, the shapes of the slits 707 are shown to be also effective in reducing the noise.

The effects of the present embodiment include not only the improvement in the demagnetization resistance but reduction of the harmonic components of the inductive voltage and that of a harmonic iron loss as well owing to the slits, so that highly efficient rotor can be obtained. As demagnetization characteristics, FIG. 12 depicts the characteristics of the demagnetizing factor of −2% or higher. That is, the improvement in the demagnetization characteristics according to the present embodiment represents the improvement in the demagnetization resistance by 2%.

Furthermore, because it is possible to attain the effects of reducing the harmonic components of the inductive voltage and reducing the cogging torque, it is possible to reduce the torque ripple, obtain the low-vibration and low-noise rotor, and extend a life of the rotor.

While the rotors described above are the six-pole rotors, it is possible to improve the demagnetization resistance and also reduce the torque ripple of a rotor the number of poles of which is other than six by applying the shapes according to the present embodiment to the rotor, and accordingly, it is made possible to obtain a highly efficient low-noise rotor.

While the eight slits are present on one magnetic pole in each of the rotors described above, any rotor can exhibit the effects of the present embodiment as long as four or more slits are present on one magnetic pole.

Furthermore, either a distributed winding or a concentrated winding can be used as a winding of a stator (not shown).

Further, when sintered rare-earth magnets are used as the permanent magnets, a magnetic flux density of the rotor is higher than that of the rotor including permanent magnets made from other materials and the influence of the slits increases because the sintered rare-earth magnets have a higher magnetic force. Therefore, when the sintered rare-earth magnets are used in the rotor, it is possible to exhibit greater effects.

Furthermore, by incorporating the motor using one of the rotors according to the first embodiment (a permanent magnet embedded motor, for example) in a compressor included in a refrigeration cycle or the like or in a blower included in an air conditioner or the like, it is possible to obtain a compressor or a blower having high demagnetization resistance, with high efficiency, at a low cost, and ensuring a long life.

Particularly, an internal temperature of the compressor is often high (100° C. or higher), and the demagnetization resistance of a rare-earth magnet is lower at a higher temperature. Therefore, the problem of demagnetization resistance of the rotor using the rare-earth magnets occurs to the motor for the compressor. By using one of the rotors according to the present embodiment, it is possible to improve the demagnetization resistance as much as possible even with the use of the shapes of the slits, and to constitute a rotor, a motor, and a compressor having high demagnetization resistance.

Reference Signs List 100 rotor, 101 rotor iron core, 102 permanent-magnet insertion hole, 102a magnet inserting portion, 102b permanent-magnet end-portion cavity, 103 permanent magnet, 103a end surface, 104 rotary shaft, 105 shaft hole, 107 slit, 107a first slit, 107b second slit, 107c third slit, 107d fourth slit, 200 rotor, 201 rotor iron core, 202 permanent-magnet insertion hole, 202a magnet inserting portion, 202b permanent-magnet end-portion cavity, 203 permanent magnet, 204 rotary shaft, 205 shaft hole, 207 slit, 207a first slit, 207b second slit, 207c third slit, 207d fourth slit, 207e fifth slit, 300 rotor, 301 rotor iron core, 302 permanent-magnet insertion hole, 302a magnet inserting portion, 302b permanent-magnet end-portion cavity, 303 permanent magnet, 304 rotary shaft, 305 shaft hole, 307 slit, 307a first slit, 307b second slit, 307c third slit, 307d fourth slit, 307e fifth slit, 400 rotor, 401 rotor iron core, 402 permanent-magnet insertion hole, 402a magnet inserting portion, 402b permanent-magnet end-portion cavity, 403 permanent magnet, 404 rotary shaft, 407 slit, 407a first slit, 407b second slit, 407c third slit, 407d fourth slit, 407e fifth slit, 500 rotor, 501 rotor iron core, 502 permanent-magnet insertion hole, 502a magnet inserting portion, 502b permanent-magnet end-portion cavity, 503 permanent magnet, 504 rotary shaft, 600 rotor, 601 rotor iron core, 602 permanent-magnet insertion hole, 602a magnet inserting portion, 602b permanent-magnet end-portion cavity, 603 permanent magnet, 604 rotary shaft, 607 slit, 700 rotor, 701 rotor iron core, 702 permanent-magnet insertion hole, 702a magnet inserting portion, 702b permanent-magnet end-portion cavity, 703 permanent magnet, 704 rotary shaft, 707 slit, 707a first slit, 707b second slit, 707c third slit, 707d fourth slit, 707e fifth slit.

The invention claimed is:

1. A rotor of a permanent magnet embedded motor, comprising:
a rotor iron core formed by stacking a predetermined number of magnetic steel sheets punched into predetermined shapes;
a plurality of permanent-magnet insertion holes formed along an outer circumferential portion of the rotor iron core, each of the permanent-magnet insertion holes including permanent-magnet end-portion cavities on its respective end portions;
a plurality of permanent magnets respectively inserted into the permanent-magnet insertion holes; and
a plurality of slits formed in an outer-peripheral side iron core portion outside of each of the permanent-magnet insertion holes and arranged symmetrically about a magnetic-pole center line, a longitudinal direction of each of the plurality of slits extending from a respective permanent-magnet insertion hole toward the outer circumferential portion of the rotor iron core, wherein
among the plurality of slits, a distance between a first slit present in a radial direction of the end portions of the permanent magnets and a second slit, which is adjacent to the first slit and closer to the magnetic-pole center line, is smaller than a distance between adjacent slits other than the first and second slits, which are present in the outer-peripheral side iron core portion of each of the permanent-magnet insertion holes, and
the first slit and the second slit are parallel to each other.

2. The rotor of a permanent magnet embedded motor according to claim 1, wherein the first slit present in the radial direction of each of the end portions of the permanent magnets is present in the radial direction of an end surface of each of the end portions of the permanent magnets.

3. The rotor of a permanent magnet embedded motor according to claim 1, wherein a different slit is provided between the first slit and an interpolar portion, the interpolar portion being a gap between magnetic poles formed by adjacent permanent magnets.

4. The rotor of a permanent magnet embedded motor according to claim 3, wherein a cross-sectional shape of the different slit is a substantially rectangular shape.

5. The rotor of a permanent magnet embedded motor according to claim 3, wherein a cross-sectional shape of the different slit is a circumferentially long shape.

6. The rotor of a permanent magnet embedded motor according to claim 1, wherein the plurality of slits present in the outer-peripheral side iron core portion of each of the permanent-magnet insertion holes in the radial direction of each of the permanent magnets are substantially perpendicular to the permanent magnet.

7. A rotor of a permanent magnet embedded motor comprising:
a rotor iron core formed by stacking a predetermined number of magnetic steel sheets punched into predetermined shapes;
a plurality of permanent-magnet insertion holes formed along an outer circumferential portion of the rotor iron core, each of the permanent-magnet insertion holes including permanent-magnet end-portion cavities on its respective end portions;
a plurality of permanent magnets respectively inserted into the permanent-magnet insertion holes; and
a plurality of slits formed in an outer-peripheral side iron core portion outside of each of the permanent-magnet insertion holes, wherein
among the plurality of slits, a distance between a first slit present in a radial direction of the end portions of the permanent magnets and a second slit, which is adjacent to the first slit and closer to the center of its magnetic pole, is smaller than a distance between adjacent slits other than the first and second slits, which are present in the outer-peripheral side iron core portion of each of the permanent-magnet insertion holes, and
the distance between the first slit and the second slit is larger than a thickness of each of the steel sheets that constitute the rotor iron core and smaller than a thickness of each of the permanent magnets in the radial direction.

8. A rotor of a permanent magnet embedded motor comprising:
a rotor iron core formed by stacking a predetermined number of magnetic steel sheets punched into predetermined shapes;
a plurality of permanent-magnet insertion holes formed along an outer circumferential portion of the rotor iron core, each of the permanent-magnet insertion holes including permanent-magnet end-portion cavities on its respective end portions;
a plurality of permanent magnets respectively inserted into the permanent-magnet insertion holes; and
a plurality of slits formed in an outer-peripheral side iron core portion outside of each of the permanent-magnet insertion holes, wherein
among the plurality of slits, a distance between a first slit present in a radial direction of the end portions of the permanent magnets and a second slit, which is adjacent to the first slit and closer to the center of its magnetic pole, is smaller than a distance between adjacent slits other than the first and second slits, which are present in the outer-peripheral side iron core portion of each of the permanent-magnet insertion holes, and a distance between the first slit and an outer circumference of the rotor is larger than a distance between the first slit and each of the permanent-magnet insertion holes.

9. The rotor of a permanent magnet embedded motor according to claim 1, wherein distances between the slits present in the radial direction of a portion in which each of the permanent magnets is present and the outer circumference of the rotor are larger than distances between the slits and each of the permanent-magnet insertion holes, respectively.

10. A blower comprising the rotor of a permanent magnet embedded motor according to claim 1.

11. A compressor comprising the rotor of a permanent magnet embedded motor according to claim 1.

* * * * *